(12) United States Patent
Maeda et al.

(10) Patent No.: US 9,394,024 B2
(45) Date of Patent: Jul. 19, 2016

(54) STORAGE STRUCTURE FOR SADDLE-RIDE TYPE VEHICLE

(71) Applicant: HONDA MOTOR CO., LTD., Tokyo (JP)

(72) Inventors: Rui Maeda, Wako (JP); Masaomi Yamada, Wako (JP); Koji Mizuta, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 11 days.

(21) Appl. No.: 14/590,114

(22) Filed: Jan. 6, 2015

(65) Prior Publication Data

US 2015/0197300 A1 Jul. 16, 2015

(30) Foreign Application Priority Data

Jan. 10, 2014 (JP) ................. 2014-003651

(51) Int. Cl.
*B60R 5/02* (2006.01)
*B62J 7/06* (2006.01)
*B62J 17/02* (2006.01)

(52) U.S. Cl.
CPC ... *B62J 7/06* (2013.01); *B62J 17/02* (2013.01)

(58) Field of Classification Search
CPC .................................. B62J 7/06; B62J 17/02
See application file for complete search history.

(56) References Cited

U.S. PATENT DOCUMENTS

2012/0234619 A1* 9/2012 Nakagome ............... B62J 35/00
180/219
2013/0249186 A1* 9/2013 Maruyama ............. B62K 11/02
280/274

FOREIGN PATENT DOCUMENTS

JP 2005-125842 A 5/2005
TW EP 2202137 A2 * 6/2010 ............... B62J 17/02

* cited by examiner

*Primary Examiner* — Lori L Lyjak
(74) *Attorney, Agent, or Firm* — Birch, Stewart, Kolasch & Birch, LLP

(57) ABSTRACT

A storage structure for a saddle-ride type vehicle to enable an item to be easily stored in or retrieved from a storage portion to improve handleability of the storage portion. The storage portion includes an opening provided at a position shifted to one or each side of a front cover in a left-right direction with a recess portion being concave downwardly from the opening to form a storage space. A lid is provided for covering the opening of the recess portion openably and closably. The lid is attached to an upper wall portion defining the recess portion, openably and closably via a hinge.

20 Claims, 21 Drawing Sheets

STORAGE STRUCTURE FOR SADDLE-RIDE TYPE VEHICLE

CROSS-REFERENCE TO RELATED APPLICATIONS

The present application claims priority under 35 USC 119 to Japanese Patent Application No. 2014-003651 filed Jan. 10, 2014 the entire contents of which are hereby incorporated by reference.

BACKGROUND OF THE INVENTION

1. Field of the Invention

The present invention relates to a storage structure for a saddle-ride type vehicle, which is provided in a front portion of a vehicle body.

2. Description of Background Art

A saddle-ride type vehicle is known with a storage portion provided in a front cover covering a front portion of a vehicle body. See, for example, Japanese Patent Application Publication No. 2005-125842.

The storage portion is provided above a headlight at the center of the front cover in a vehicle width direction, and includes an openable and closable lid. The lid has a structure in which its front end portion side opens upwardly with its rear end portion side serving as a fulcrum.

In Japanese Patent Application Publication No. 2005-125842, since a front wheel is located frontward of and below the storage portion, it is hard to store or retrieve an item in or from the storage portion from the front of the vehicle body. In addition, due to the structure in which the front end portion side of the lid opens upwardly, it is also not easy to store or retrieve an item in or from the side of the vehicle body. Moreover, the location of an actuation portion for opening the lid also affects the handleability of the storage portion. Thus, it is desired that the position of the actuation portion be taken into account, as well.

SUMMARY AND OBJECTS OF THE INVENTION

The present invention has been made in consideration of the above circumstances, and has an object of an embodiment of the present invention to provide a storage structure for a saddle-ride type vehicle, which facilitates storage and retrieval of an item in and from a storage portion for improving handleability.

For the purpose of solving the above-mentioned problems, according to an embodiment of the present invention a storage structure for a saddle-ride type vehicle includes a vehicle-body frame (F) with a steering shaft (425) being rotatably supported at a front end of the vehicle-body frame (F) to make a front wheel (2) steerable. A front cover (47) is placed to surround the steering shaft (425) for covering a front portion of a vehicle body. A storage portion (401L, 401R) is provided on a front surface of the front cover (47), wherein the storage portion (401L, 401R) includes an opening (411b) provided at a position shifted to one or each of sides of the front cover (47) in a left-right direction. A recess portion (411s) is concave downwardly from the opening (411b) to form a storage space. A lid (403L, 403R) is provide for covering the opening (411b) openably and closably. The lid (403L, 403R) is attached to a vehicle-width-direction inner side portion (411r) defining the recess portion (411s), openably and closably via a hinge (412).

The above configuration may be such that an actuator (405) is provided at one or each of side portions of the front cover 47 wherein manipulation of the actuator (405) changes the lid (403L, 403R) from a locked state to an open state. The locked state being where the lid (403L, 403R) is locked with the front cover (47) side.

According to an embodiment of the present invention, the opening (411b) is substantially rectangular and is placed with a longer side thereof being along the front cover (47) in a substantial front-rear direction of the vehicle. The lid (403L, 403R) is biased to be in the open state.

According to an embodiment of the present invention, a side mirror (59) is placed rearwardly of the lid (403L, 403R), a front side cover (55L, 55R) is placed below the lid (403L, 403R), and when the lid (403L, 403R) is in the locked state, the actuator (405) is, in a side view, provided at a location surrounded by the lid (403L, 403R), the side mirror (59), and the front side cover (55L, 55R).

According to an embodiment of the present invention, an actuation inhibition member (475) configured to inhibit the lid (403L, 403R) from opening is provided in addition to the actuator (405), the actuation inhibition member (475) is connected to a key cylinder (407) via a cable (435), and inhibition by the actuation inhibition member (475) is released only when predetermined manipulation is performed on the key cylinder (407).

According to an embodiment of the present invention, the key cylinder (407) is placed inside a vehicle-body cover (F) on the actuator (405) side, at a position overlapping the steering shaft (425) in a side view.

According to an embodiment of the present invention, a kickstand (67) is provided on a left side of the vehicle body, the key cylinder (407), the actuation inhibition member (475), and the cable (435) are placed leftward of a center of the vehicle body, the actuation inhibition member (475) inhibits only the actuator (405) that is located on the left side from unlocking the lid in the locked state, and an electric component (415, 416) is placed in the left storage portion (401L).

According to an embodiment of the present invention, the electric component is a cigarette socket (416) that is attached to a front wall (411h) of the storage portion (401L).

According to an embodiment of the present invention, the electric component is a vehicle-mounted ETC device (415) that is attached in a rear portion of the storage portion (401L).

According to an embodiment of the present invention, in a side view, the storage portion (401L) is formed to have a step descending to a front side of the vehicle body. The vehicle-mounted ETC device (415) is placed on an upper portion of a step portion (411t) forming the step.

According to an embodiment of the present invention, the storage portion includes the opening provided at a position shifted to one or each of sides of the front cover in the left-right direction with recess portion being concave downwardly from the opening to form a storage space. The lid covers the opening in an openably and closably manner. Thus, the lid can be opened wide vertically at its outer end portion in the vehicle width direction, enabling an item to be easily stored in or retrieved from the storage portion from the side of the vehicle body.

In addition, the actuator is provided at one or each of side portions of the front cover. The manipulation of the actuator changes the lid from the locked state, where the lid is locked with the front cover side, to the open state. Since the actuator is thus provided at the side portion(s) of the front cover, the actuator can be easily operated to open the lid and store or retrieve an item in or from the side of the vehicle body. Thus, handleability of the storage portion can be improved.

Further, the opening is substantially rectangular and is placed with a longer side thereof being along the front cover in the substantial front-rear direction of the vehicle, and the lid is biased to be in the open state. Since the opening is substantially rectangular, which is long in the substantial front-rear direction of the vehicle, the driver can easily store or retrieve an item while standing on the side of the vehicle. Since the lid is biased to be in the open state, convenience improves.

Moreover, the side mirror is placed rearwardly of the lid, and the front side cover is placed below the lid. When the lid is in the locked state, the actuator is, in a side view, provided at a location surrounded by the lid, the side mirror, and the front side cover. By thus placing the actuator at the location where multiple components exist and dimensional errors are likely to occur, the dimensional errors can be absorbed while keeping the outer appearance favorable. Thus, the assemblability can be improved.

Further, the actuation inhibition member configured to inhibit the lid from opening is provided in addition to the actuator, and the actuation inhibition member is connected to the key cylinder via the cable. Inhibition by the actuation inhibition member is released only when the predetermined manipulation is performed on the key cylinder. Since the actuation inhibition member does not permit the lid to be opened without the driver's intent, the lid can be prevented from opening without the driver's intent.

Further, the key cylinder is placed inside the vehicle-body cover on the actuator side, at a position overlapping the steering shaft in a side view. Thus, the key cylinder and the actuator are both placed at the front portion of the vehicle body, so that the key cylinder and the actuator can be placed more closely to each other. This can shorten the length of the cable provided between the key cylinder and the actuator.

Further, the kickstand is provided on the left side of the vehicle body, and the key cylinder, the actuation inhibition member, and the cable are placed leftward of the center of the vehicle body. The actuation inhibition member inhibits only the actuator that is located on the left side from unlocking the lid in the locked state. An electric component is placed in the storage portion that is located on the left side. Since only the left actuator is inhibited from unlocking the lid in the locked state, the lid of the left storage portion cannot be opened easily when the vehicle is parked on the left side of a road using the kickstand. Thus, vandalization on the electric component stored in the left storage portion can be prevented.

Moreover, the electric component is the cigarette socket and is attached to the front wall of the storage portion. Thus, effective use can be made of the space in the storage portion. In addition, handleability of the cigarette socket can be improved.

Further, the electric component is the vehicle-mounted ETC device and is provided in a rear portion of the storage portion. Thus, effective use can be made of the space inside the storage portion. Thus, the handleability of the vehicle-mounted ETC device can be improved.

Further, in a side view, the storage portion is formed to have a step descending to a front side of the vehicle body, and the vehicle-mounted ETC device is placed on an upper portion of the step portion forming the step. Thus, effective use of the space in the storage portion can be made. Thus, the handleability of the vehicle-mounted ETC device can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
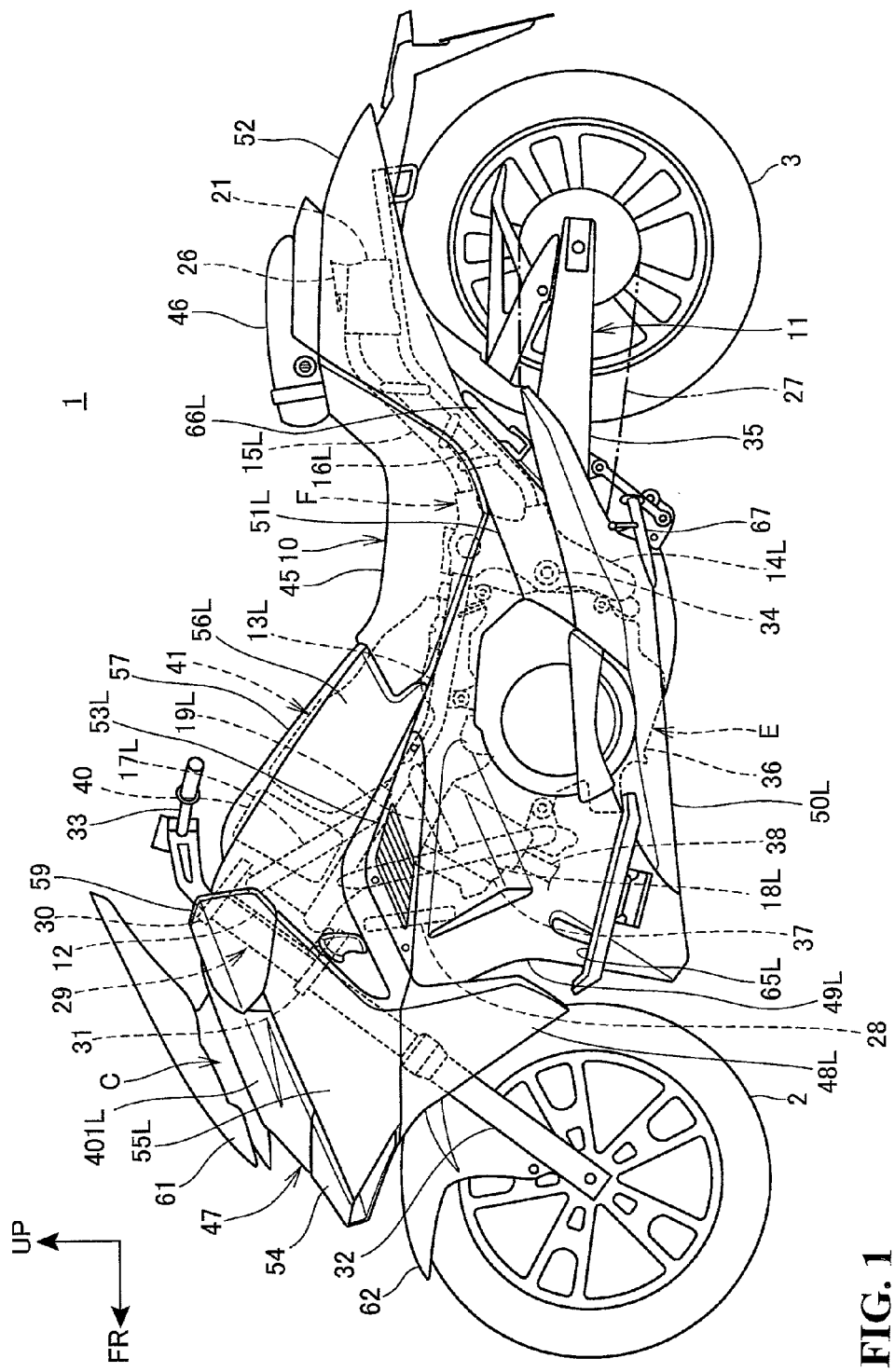
FIG. 1 is a left-side view of a motorcycle equipped with a vehicle-body storage structure of the present invention.

An embodiment of the present invention is described below with reference to the drawings. Throughout the description, directions such as front, rear, left, right, up, and down are the same as those of a vehicle body, unless otherwise noted. Moreover, reference sign FR shown in the drawings denotes a front side of the vehicle body, sign UP denotes an upper side of the vehicle body, and reference sign LE denotes a left side of the vehicle body.

Figure 2:
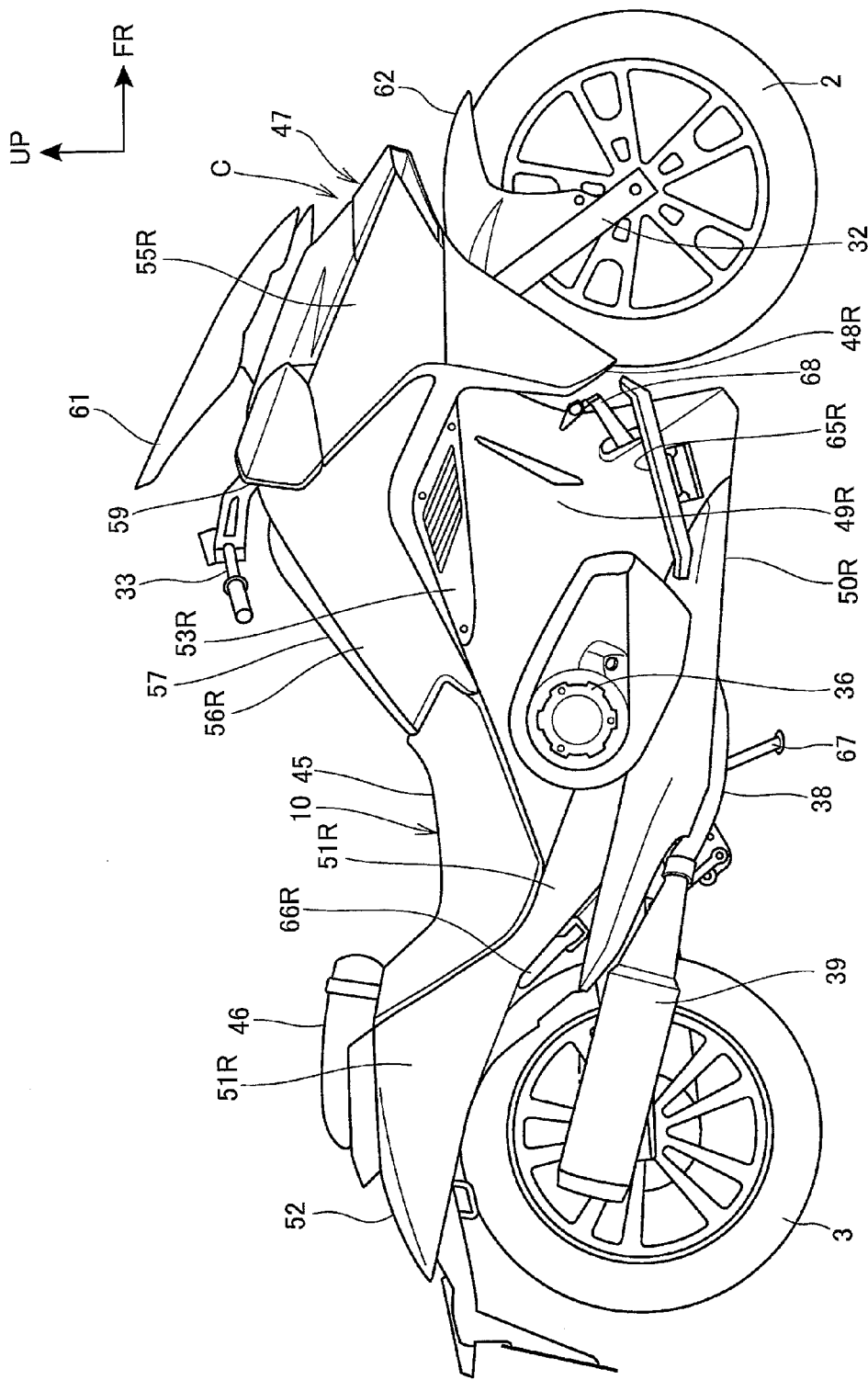
FIG. 2 is a right side view of the motorcycle.
Figure 3:
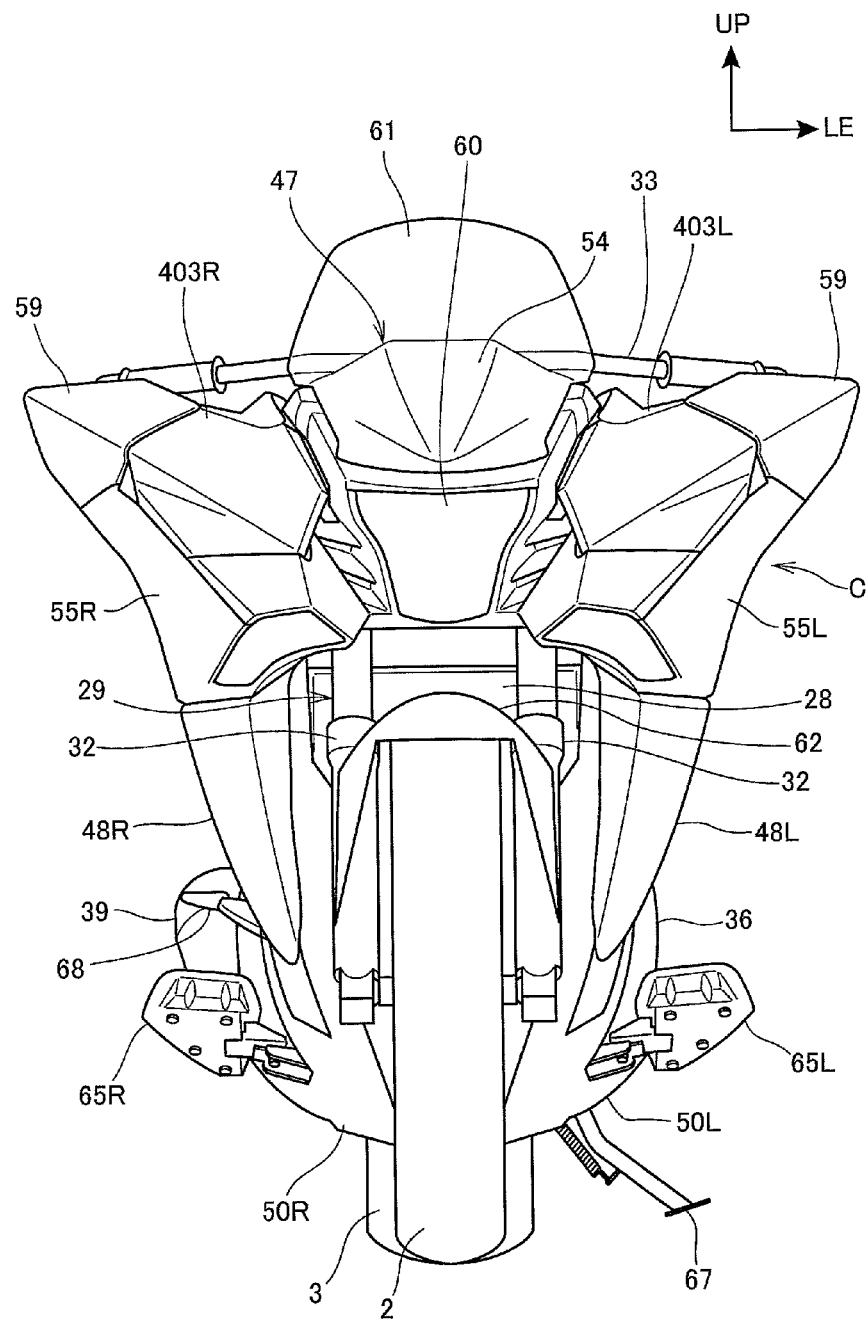
FIG. 3 is a front view of the motorcycle.
Figure 4:
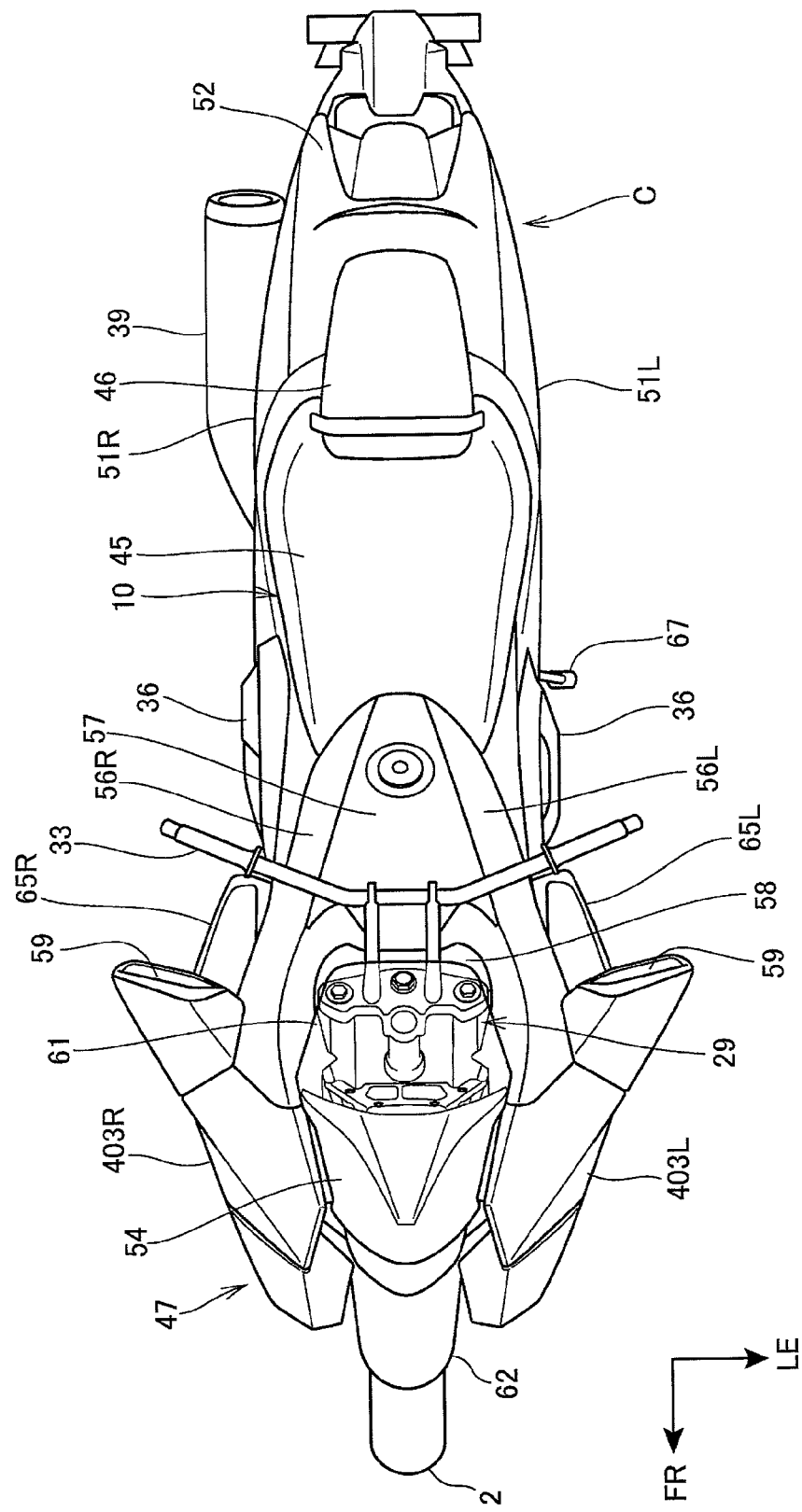
FIG. 4 is a plan view of the motorcycle.

FIG. 1 is a left side view of a motorcycle 1 equipped with a vehicle-body storage structure of the present invention. FIG. 2 is a right side view of the motorcycle 1. FIG. 3 is a front view of the motorcycle 1. FIG. 4 is a plan view of the motorcycle 1.

As shown in FIGS. 1 to 4, the motorcycle 1 is a saddle-ride type vehicle ridden by a driver by straddling its seat. The motorcycle 1 has a front wheel 2 located frontward of a vehicle-body frame F and a rear wheel 3, which is a drive wheel, pivotally supported by a swing arm 11 located in a rear portion of the vehicle. An engine E is supported by the vehicle-body frame F at a position frontward of a seat 10. The majority of the vehicle-body frame F is covered by a vehicle-body cover C made of a resin.

Figure 5:
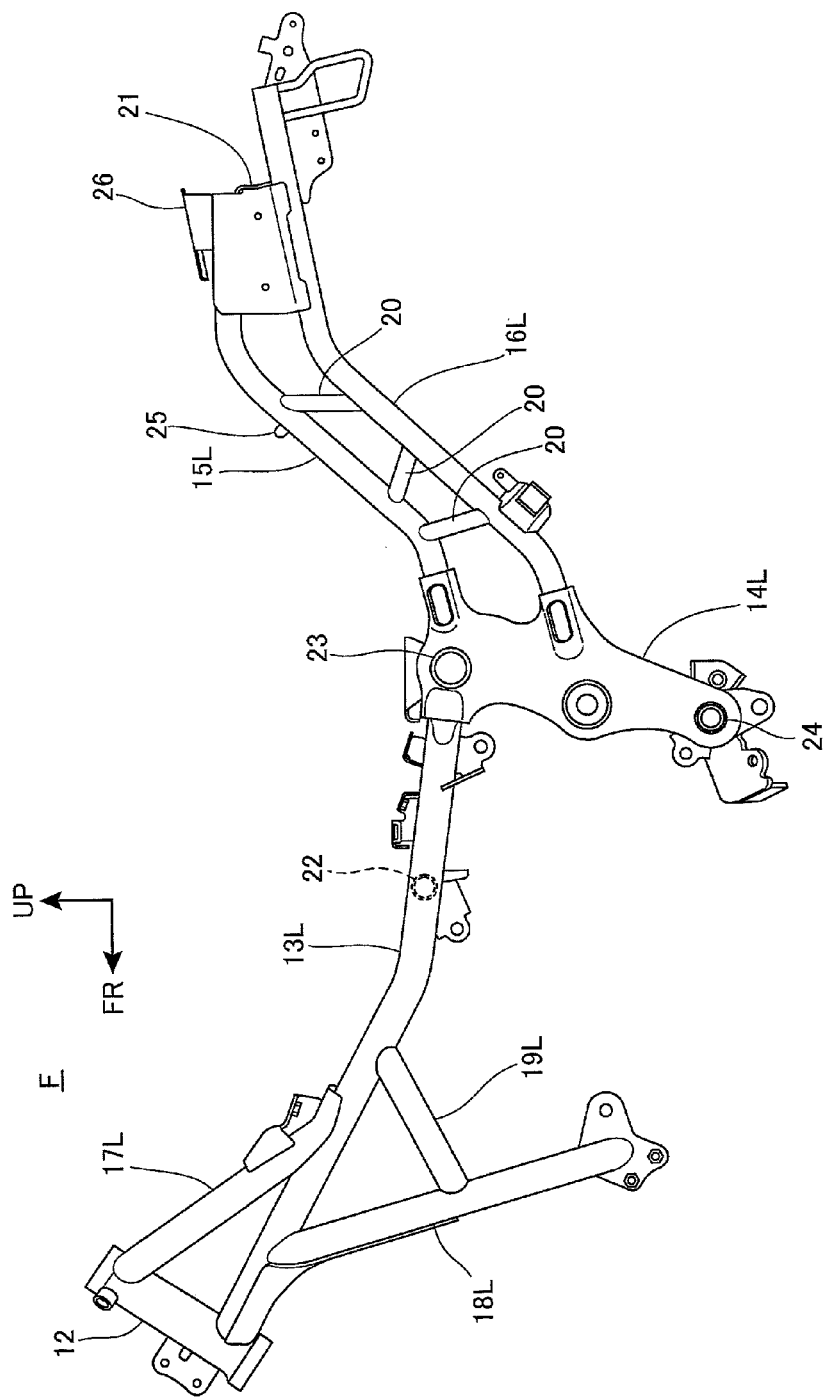
FIG. 5 is a left side view of a vehicle-body frame.
Figure 6:
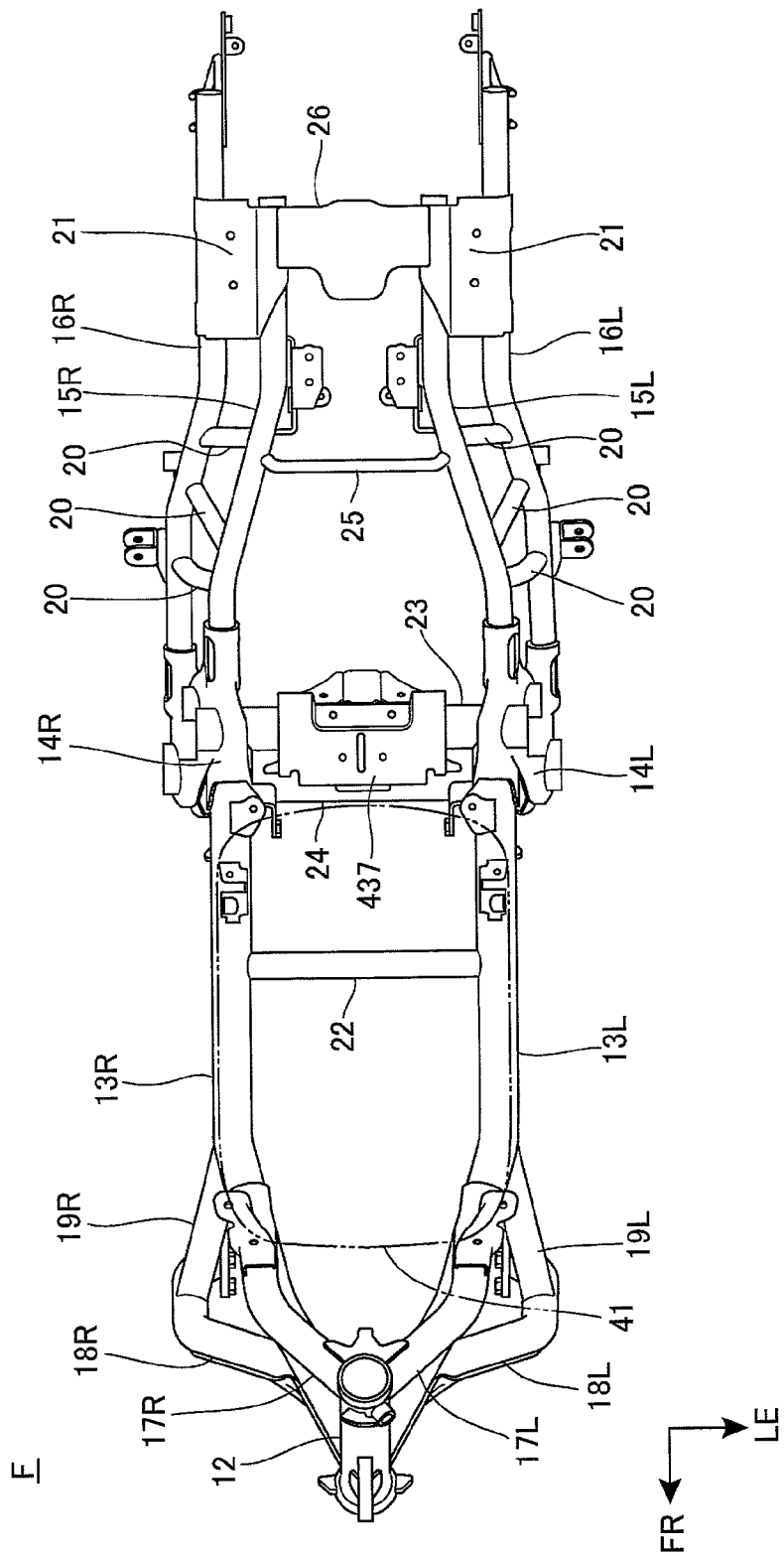
FIG. 6 is a plan view of the vehicle-body frame.

FIG. 5 is a left side view of the vehicle-body frame F. FIG. 6 is a plan view of the vehicle-body frame F.

As shown in FIGS. 1, 5, and 6, the vehicle-body frame F is formed by coupling multiple pipes and plate members made of metal, through welding or the like. The vehicle-body frame F includes a head pipe 12 provided at a front end; paired left and right main frames 13L, 13R extending rearwardly and downwardly from a lower portion of the head pipe 12 while branching to the left and right. Paired left and right pivot frames 14L, 14R extend downwardly from rear ends of the main frames 13L, 13R, respectively with paired left and right seat frames 15L, 15R extending rearwardly and upwardly from upper portions of the pivot frames 14L, 14R, respectively. Paired left and right rear frames 16L, 16R extend rearwardly and upwardly from vertically-middle portions of the pivot frames 14L, 14R and are connected to the seat frames 15L, 15R.

The vehicle-body frame F also includes paired left and right gusset frames 17L, 17R extending rearwardly and downwardly from an upper portion of the head pipe 12 and being connected to front portions of the main frames 13L, 13R, respectively with paired left and right engine hangers 18L, 18R extending rearwardly and downwardly from front portions of the main frames 13L, 13R, respectively. Paired left and right support frames 19L, 19R extend rearwardly and upwardly from vertically-middle portions of the engine hangers 18L, 18R and are connected to the main frames 13L, 13R, respectively.

The rear frames 16L, 16R are located outwardly of the seat frames 15L, 15R in the vehicle width direction and below the seat frames 15L, 15R, and extend rearwardly along the seat frames 15L, 15R. Rear ends of the rear frames 16L, 16R are located rearwardly of rear ends of the seat frames 15L, 15R. The seat frames 15L, 15R and rear frames 16L, 16R are connected by multiple pipe-shaped reinforcement frames 20.

The rear ends of the seat frames 15L, 15R are connected to rear portions of the rear frames 16L, 16R by paired left and right reinforcement plates 21, 21 provided to cover the seat frames 15L, 15R and the rear frames 16L, 16R from outer sides in the vehicle width direction, respectively.

The vehicle-body frame F includes multiple cross frames extending in the vehicle width direction to connect the left and right frames together. Such cross frames include a front cross frame 22 connecting the main frames 13L, 13R, an upper-portion cross frame 23 connecting upper portions of the pivot frames 14L, 14R, a lower-portion cross frame 24 connecting lower portions of the pivot frames 14L, 14R, a rear cross frame 25 connecting portions of the seat frames 15L, 15R which portions are in the middle in a front-rear direction, and a plate-shaped rear-end-portion cross frame 26 connecting rear end portions of the seat frames 15L, 15R. Left and right ends of the rear-end-portion cross frame 26 are, specifically, connected to upper surfaces of the reinforcement plates 21, 21, respectively.

As shown in FIG. 1, a steering system 29 for steering the front wheel 2 includes a steering shaft (not shown) pivotally and turnably supported by the head pipe 12 with a top bridge 30 connected to an upper end of the steering shaft. A bottom bridge 31 is connected to a lower end of the steering shaft with paired left and right front forks 32, 32 supported by the top bridge 30 and the bottom bridge 31. The front forks 32 are telescopic shock absorbers and include springs and damping-force generation mechanisms to absorb and damp shocks. A steering handlebar 33 is provided at an upper portion of the top bridge 30. The front wheel 2 is pivotally supported by lower ends of the front forks 32, 32.

The swing arm 11 is pivotally and swingably supported by a pivot 34 inserted between the left and right pivot frames 14L, 14R. The swing arm 11 includes paired left and right arm portions 35 extending from a front end portion thereof pivotally supported by the pivot 34, to sides of the rear wheel 3 and a connection portion (not shown) connecting front portions of the left and right arm portions 35. The rear wheel 3 is pivotally supported between rear ends of the left and right arm portions 35.

A rear shock absorber unit (not shown) is laid between the swing arm 11 and the upper-portion cross frame 23.

The engine E is a four-stroke engine having multiple cylinders in parallel with a crankcase 36 provided with a crankshaft (not shown) and a cylinder portion 37 extending upwardly from an upper portion of a front portion of the crankcase 36 in a frontward-tiled manner. A transmission (not shown) for transmitting power of the engine E to the rear wheel 3 side is incorporated in a rear portion of the crankcase 36. Output of the engine E is transmitted to the rear wheel 3 via a drive chain 27.

As shown in FIGS. 1 and 6, the engine E is mounted on the vehicle-body frame F in a suspended manner, being connected to the engine hangers 18L, 18R, the main frames 13L, 13R, and the pivot frames 14L, 14R. The cylinder portion 37 is placed between the left and right engine hangers 18L, 18R.

An exhaust pipe 28 drawn from a front surface of the cylinder portion 37 bends and extends rearwardly to be connected to a muffler 39 (see FIG. 2) placed on the right side of the rear wheel 3. A radiator 28 for coolant for the engine E is placed at a position frontward of the cylinder portion 37 and below the head pipe 12.

An air-cleaner box 40 is placed at a position above the cylinder portion 37 and rearwardly of the head pipe 12, and is connected to an intake port of the cylinder portion 37 via a connecting tube (not shown) and a throttle tube body (not shown).

A fuel tank 41 is provided adjacent and rearward of the air-cleaner box 40, and is supported on the main frames 13L, 13R.

The seat 10 includes a main seat 45 on which a driver sits and a rear seat 46 on which a passenger sits. The main seat 45 is placed to be continuous with a rear portion of the fuel tank 41 and supported by the main frames 13L, 13R. The rear seat 46 is provided rearwardly of the main seat 45 at a position raised from the main seat 45.

Paired left and right footrests 65L, 65R for the driver are placed at positions frontward of the engine E and below the handlebar 33. The driver sitting on the main seat 45 bends his/her knees to put the portions under the knees, therefore the feet, frontward and places their feet on the footrests 65L, 65R.

As shown in FIGS. 2 and 6, a brake pedal 68 for operating a brake on the rear wheel 3 is provided frontward of the right footrest 65R.

The passenger on the rear seat 46 places his/her feet on paired left and right passenger footrests 66L, 66R provided below the rear seat 46.

As shown in FIGS. 1 to 4, the vehicle-body cover C includes a front cover 47 extending from above the front wheel 2 toward the fuel tank 41 to cover a front portion of the vehicle around the head pipe 12 extensively with paired left and right front lower side covers 48L, 48R extending downwardly from a left front portion and a right front portion of the front cover 47 and covering a rear portion of an upper portion of the front wheel 2 from the sides, respectively. The vehicle-body cover C also includes paired left and right center side covers 49L, 49R extending from behind the front wheel 2 to the pivot frames 14L, 14R and covering the engine E and the pivot frames 14L, 14R from the sides.

The vehicle-body cover C further includes paired left and right under covers 50L, 50R being continuous with lower edges of the center side covers 49L, 49R and extending from below the engine E to a front portion of the swing arm 11 with rear side covers 51L, 51R covering from the pivot frames 14L, 14R to rear ends of the rear frames 16L, 16R, respectively. The vehicle-body cover C also includes a tail cover 52 placed to laid between rear ends of the rear side covers 51L, 51R with paired left and right ventilation covers 53L, 53R provided between a rear portion of the front cover 47 and front portions of the center side covers 49L, 49R, respectively, each ventilation cover being provided with ventilation holes. Upper edges of the center side covers 49L, 49R are provided along a lower edge of a rear portion of the front cover 47 and a lower edge of the main seat 45. Front end portions of the rear side covers 51L, 51R are located between rear end portions of the center side covers 49L, 49R and the under covers 50L, 50R, respectively.

Part of the crankcase 36 is not covered by the vehicle-body cover C and is exposed to the left and right sides.

The front cover 47 includes a front-surface cover portion 54 provided frontward of the head pipe 12 with paired left and right side cover portions 55L, 55R covering a portion frontward of the head pipe 12 from the front and the sides. Paired left and right tank cover portions 56L, 56R are provide for covering, rearward of the head pipe 12, the air-cleaner box 40 and the fuel tank 41 from the sides. An upper-surface cover portion 57 laterally connects the tank cover portions 56L, 56R and covers the air-cleaner box 40 and the fuel tank 41 from above.

The front-surface cover portion 54, the side cover portions 55L, 55R, the tank cover portions 56L, 56R, and the upper-surface cover portion 57 constitute the front cover 47 by being arranged to surround the head pipe 12. A space portion 58 (see FIG. 4) is formed in a center portion of the front cover 47 so that the steering system 29 can turn inside the front cover 47.

Paired left and right side mirrors 59, 59 are integrally provided respectively at a left end of an upper portion of the side cover portion 55L and a right end of an upper portion of the side cover portion 55R.

A headlight 60 is provided at the front-surface cover portion 54. A windscreen 61 is provided at a rear portion of the front-surface cover portion 54.

A front fender 62 is fixed to the front forks 32, 32. A kickstand 67 is attached to the left pivot frame 14L. When parked using the kickstand 67, the motorcycle 1 tilts leftward.

Figure 7:
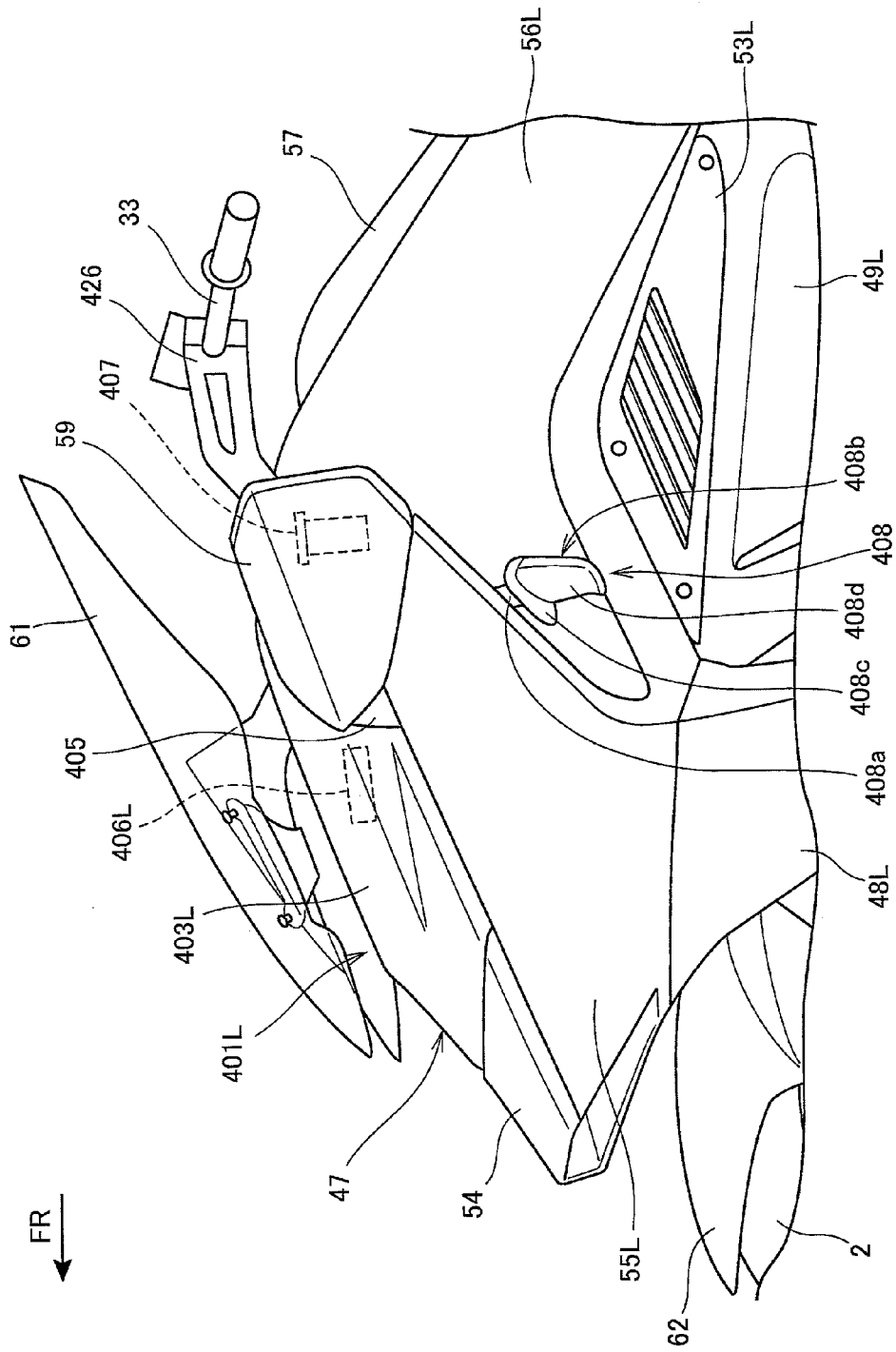
FIG. 7 is a left side view showing a front portion of a vehicle body of the motorcycle.
Figure 8:
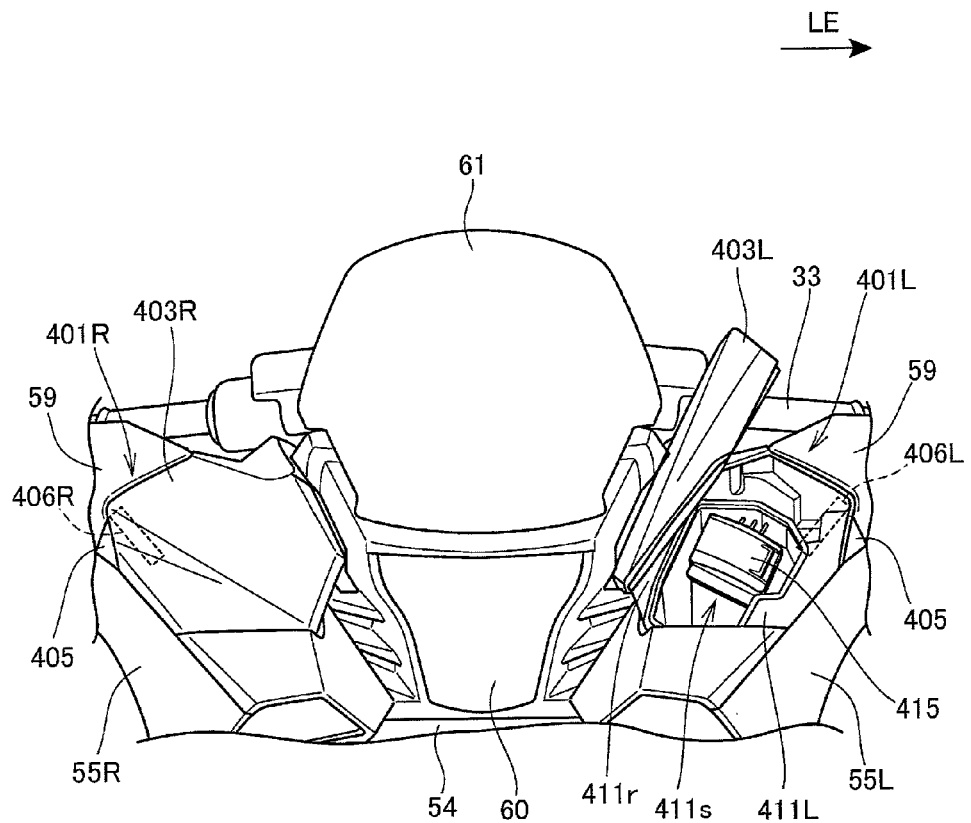
FIG. 8 is a main-portion front view showing the front portion of the vehicle body of the motorcycle.

FIG. 7 is a left side view showing a front portion of the vehicle body of the motorcycle 1. FIG. 8 is a main-portion front view showing the front portion of the vehicle body of the motorcycle 1.

As shown in FIGS. 7 and 8, paired left and right storage portions 401L, 401R are provided at the front cover 47. More specifically, the front-surface cover portion 54. The storage portions 401L, 401R are provided at positions adjacent to the left and right side mirrors 59, 59, and include lids 403L, 403R, respectively. FIG. 8 shows a state where the left lid 403L is open. A left lid actuator 405, which is formed in a triangular shape in a side view (see FIG. 7) and allows the lid 403L to open, is provided in a portion surrounded by the side cover portion 55L located adjacently below the lid 403L and the side mirror 59 located adjacently rearwardly of the lid 403L. Similarly, a right lid actuator 405, which is formed in a triangular shape in a side view and allows the lid 403R to open, is provided in a portion surrounded by the side cover portion 55R located adjacent and below the lid 403R and the side mirror 59 located adjacent and rearward of the lid 403R.

Each lid actuator 405 is provided to be flush with its surrounding surfaces (the lid 403L, 403R, the side cover portion 55L, 55R, and the side mirror 59, 59). When the lid actuator 405 is pushed inwardly in the vehicle width direction, a lid lock mechanism 406L, 406R locking the lid 403L, 403R to a closed state is actuated to unlock and open the lid 403L, 403R in the closed state. Note that only the left storage portion 401L has a security function which requires predetermined manipulation to be performed together with manipulation of the lid actuator 405 to open the lid 403L (the security function will be described in detail later).

A key cylinder 407 is provided at a position rearwardly of the left storage portion 401L and the left lid lock mechanism 406L and inward of the left side mirror 59 in the vehicle width direction. The key cylinder 407 is connected, via cables (not shown), to the lid lock mechanism 406L and a seat lock mechanism (not shown) for locking the detachable main seat 45 (see FIG. 1).

The left storage portion 401L and the right storage portion 401R have a similar structure, except for being different in the structures of the lid lock mechanism 406L and the lid lock mechanism 406R and the shapes of storage spaces to be described later.

In FIG. 7, a parking brake lever 408 extends downwardly from a rear edge portion of the left side cover portion 55L. The parking brake lever 408 is used to put a brake on the front wheel 2 or the rear wheel 3 (see FIG. 1) while the vehicle is parked. The parking brake lever 408 includes an arm portion 408a having one end portion swingably attached inside the side cover portion 55L with a grip portion 408b attached to the other end portion of the arm portion 408a. The grip portion 408b integrally includes a flange portion 408c provided at an upper end portion of the grip portion 408b with a straight portion 408d extending downwardly from the flange portion 408c to be gripped by a hand.

Since a rear edge portion of the side cover portion 55L is bent inwardly relative to an outer side surface of the side cover portion 55L, the parking brake lever 408 can be placed rearwardly of the rear edge portion of the side cover portion 55L. Thus, the parking brake lever 408 is not noticeable from the front of the vehicle. In addition, the parking brake lever 408 has less influence on a flow of air flowing along the side of the vehicle body.

Figure 9:
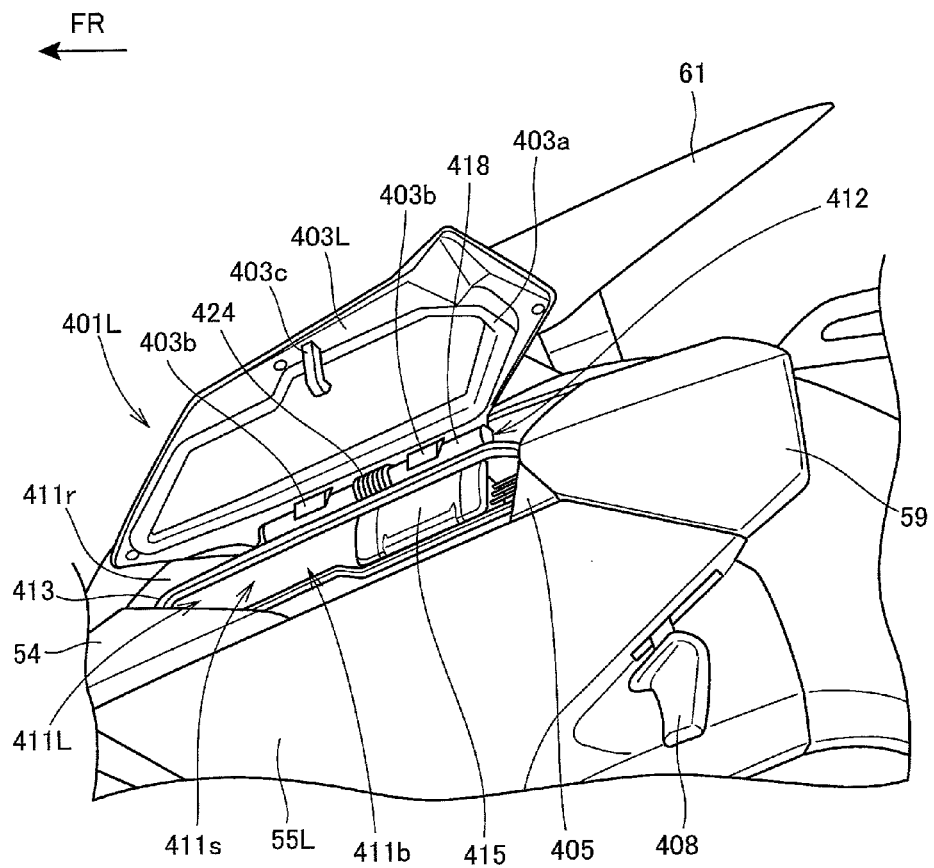
FIG. 9 is a left side view showing a state where a lid of a storage portion is open.
Figure 10:
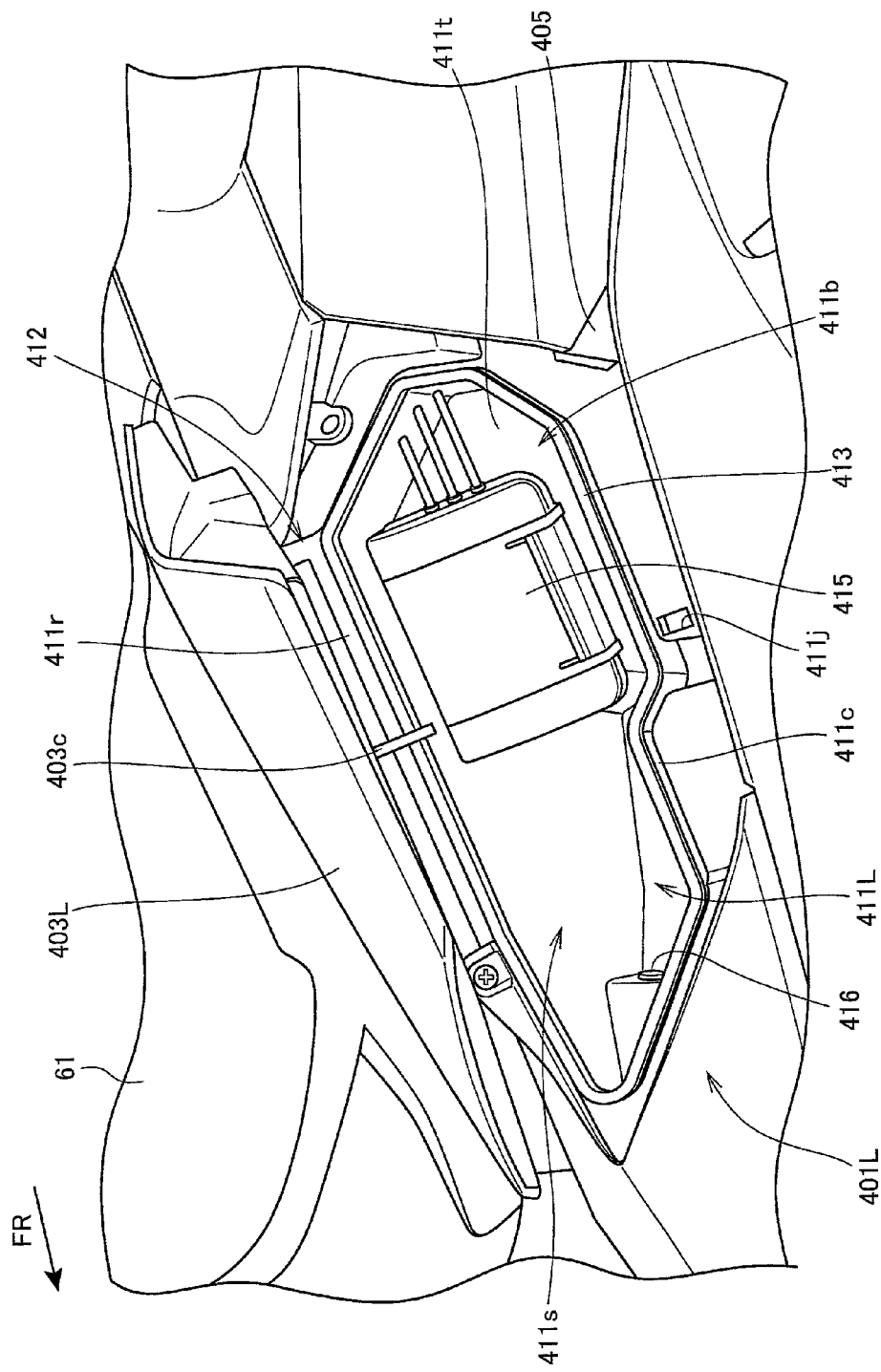
FIG. 10 is a perspective view showing a state where the lid of the storage portion is open.

FIG. 9 is a left side view showing a state where the lid 403L of the storage portion 401L is open, and FIG. 10 is a perspective view showing a state where the lid 403L of the storage portion 401L is open.

As shown in FIGS. 9 and 10, the storage portion 401L includes a storage-portion main body 411L shaped like a box with an open top with the lid 403L attached openably and closably via a hinge 412 to an upper side wall portion 411r of the storage-portion main body 411L, the upper side wall portion 411r being located inwardly in the vehicle width direction. Thus, the lid 403L has a sideways-opening structure in which its outer side in the vehicle width direction opens to expose the inside sideways. An opening 411b of the storage-portion main body 411L is oriented obliquely upwardly and to the side of the vehicle body. This allows, together with the sideways-opening structure described above, an item to be easily stored in or retrieved from the storage portion 401L from the side of the vehicle body.

A recess portion 411s defining a storage space with the lid 403L is provided in the storage-portion main body 411L with an endless sealing member 413 being attached to a peripheral edge portion 411c of the opening 411b of the recess portion 411s. The lid 403L has an annular peripheral wall 403a formed on its back surface, and the peripheral wall 403a has the same outline as the peripheral edge portion 411c of the storage-portion main body 411L. Thus, when the lid 403L is closed, the peripheral wall 403a is pressed against and comes into tight contact with the sealing member 413 on the storage-portion main body 411L side, preventing ingress of dirt, dust, rainwater, and the like into the storage portion 401L.

An inside of the recess portion 411s is formed to have steps a front portion of the recess portion 411s is deep, while a rear portion of the recess portion 411s is formed as a step portion 411t which is lowered from the opening 411b so that the rear portion may be shallower than the aforementioned front portion. For example, an electric component, such as a vehicle-mounted ETC device 415, is stored on the step portion 411t with a cigarette socket 416 being an electric component is provided in the front portion.

Since a portion of the cigarette socket 416 into which a cigarette plug is to be inserted is provided inside the recess portion 411s, rainwater, dirt, and dust can be prevented from entering the cigarette socket 416. Thus, safe electrical conductivity between the cigarette socket 416 and the cigarette plug can be ensured for a long period of time. Moreover, since the cigarette socket 416 has a structure in which a cigarette plug is inserted thereinto from the rear to the front, the recess portion 411s which is long in a front-rear direction facilitates the insertion of the cigarette plug. Thus, the handleability is improved.

The right storage portion 401R (see FIG. 8) has almost the same structure as the left storage portion 401L described above, but is not provided with the step portion 411t and therefore has a larger storage capacity than the left storage portion 401L with both of a front portion and a rear portion of the recess portion of the storage-portion main body being formed deeply.

Figure 11:
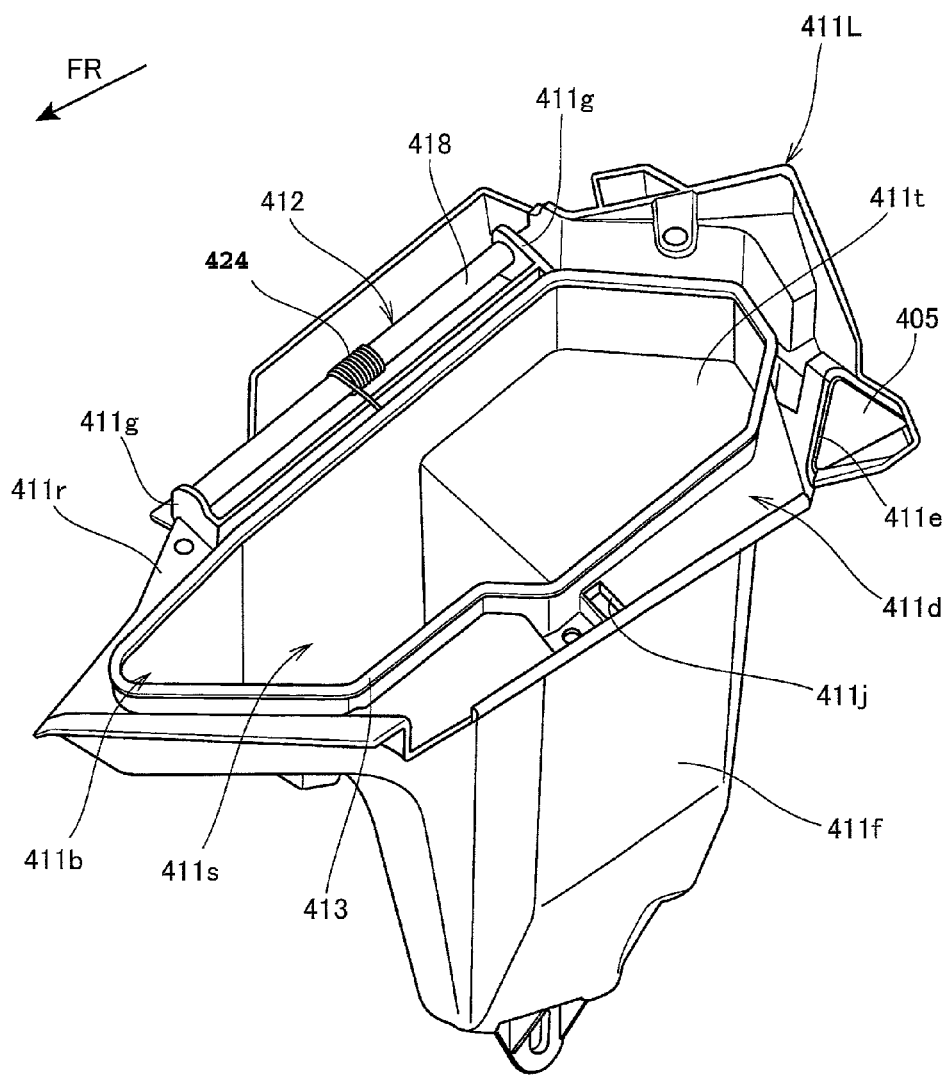
FIG. 11 is a perspective view showing a storage-portion main body and a hinge.
Figure 12:
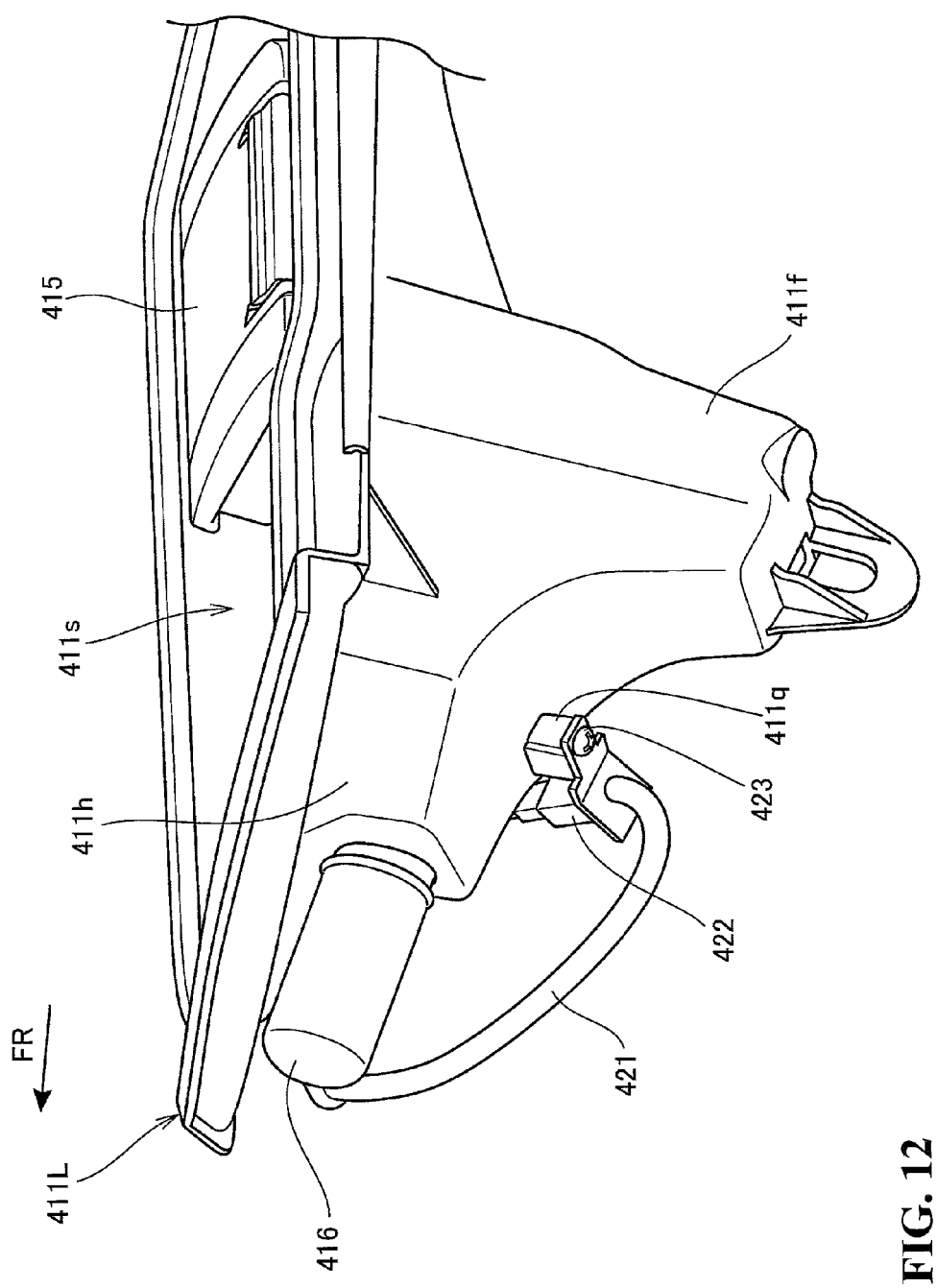
FIG. 12 is a perspective view showing a main portion of the storage-portion main body.

FIG. 11 is a perspective view showing the storage-portion main body 411L and the hinge 412, and FIG. 12 is a perspective view showing a main portion of the storage-portion main body 411L.

The storage-portion main body 411L includes an opening surrounding portion 411d formed to surround the opening 411b with an actuator insertion hole 411e provided in the opening surrounding portion 411d to insert the lid actuator 405 thereto. A lower storage portion 411f is formed below the opening surrounding portion 411d.

Since the vehicle-mounted ETC device 415 (see FIG. 10) is placed on the step portion 411t which is located at a high position in the recess portion 411s, an ETC card can be inserted to and removed from the vehicle-mounted ETC device 415 easily, and thereby handleability can be improved.

Moreover, since the actuator insertion hole 411e for inserting the lid actuator 405 is provided in the storage-portion main body 411L, the storage-portion main body 411L to which the storage-portion main body 411L is pre-attached can be attached to the vehicle body side in a production line. Thus, productivity can be improved.

An upper bulging wall 411h bulging to the front side of the vehicle body is formed at an upper portion of the lower storage portion 411f with the cigarette socket 416, which is long in the front-rear direction, being attached to the upper bulging wall 411h. An interconnection 421 is connected to the cigarette socket 416 with a connector 422 being attached to a tip end portion of the interconnection 421. The connector 422 is attached, with a screw 423, to a connector attachment portion 411q which is integrally formed in a lower portion of the upper bulging wall 411h. Because the storage-portion main body 411L is thus provided with the connector attachment portion 411q to which the connector 422 is to be attached, the number of components can be reduced compared to a case where a special attachment portion is provided for the connector 422. Thus, cost reduction can be achieved.

The hinge 412 has paired front and rear main-body-side hinge portions 411g, 411g, a hinge shaft 418, and lid-side hinge portions 403b (see FIG. 9). The main-body-side hinge portions 411g, 411g are formed integrally at the upper side wall portion 411r of the opening surrounding portion 411d, located inward in the vehicle width direction. The main-body-side hinge portions 411g, 411g are away from each other in the front-rear direction. The hinge shaft 418 is rotatably laid between the main-body-side hinge portions 411g, 411g. The lid-side hinge portions 403b are formed integrally with the lid 403L (see FIG. 9) and attached to the hinge shaft 418. A torsion coil spring 424 is wound around the hinge shaft 418 at its both ends, and biases the lid 403L in a direction to open the lid 403L from the storage-portion main body 411L.

Figure 13:
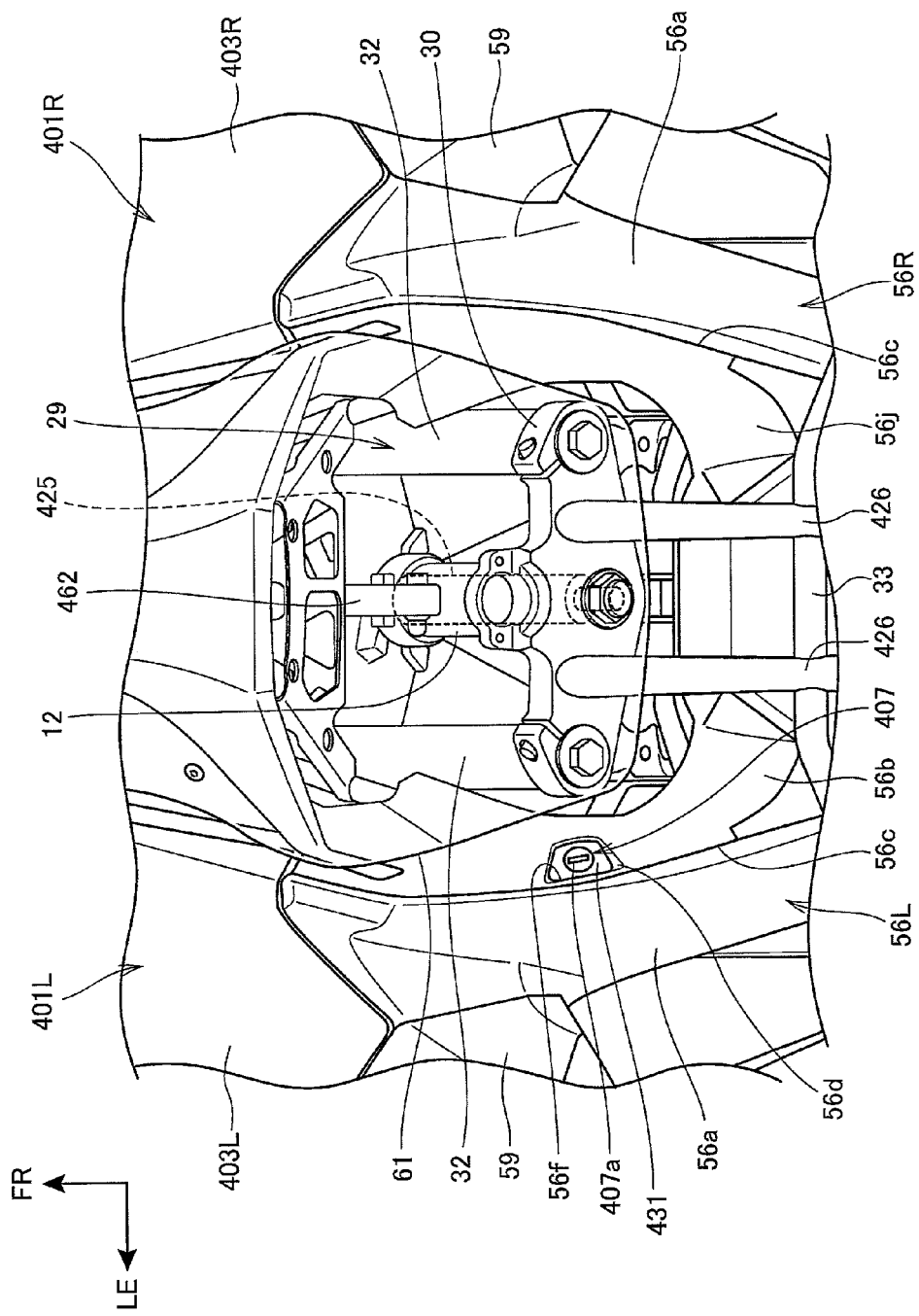
FIG. 13 is a main-portion plan view showing the front portion of the vehicle body of the motorcycle.
Figure 14:
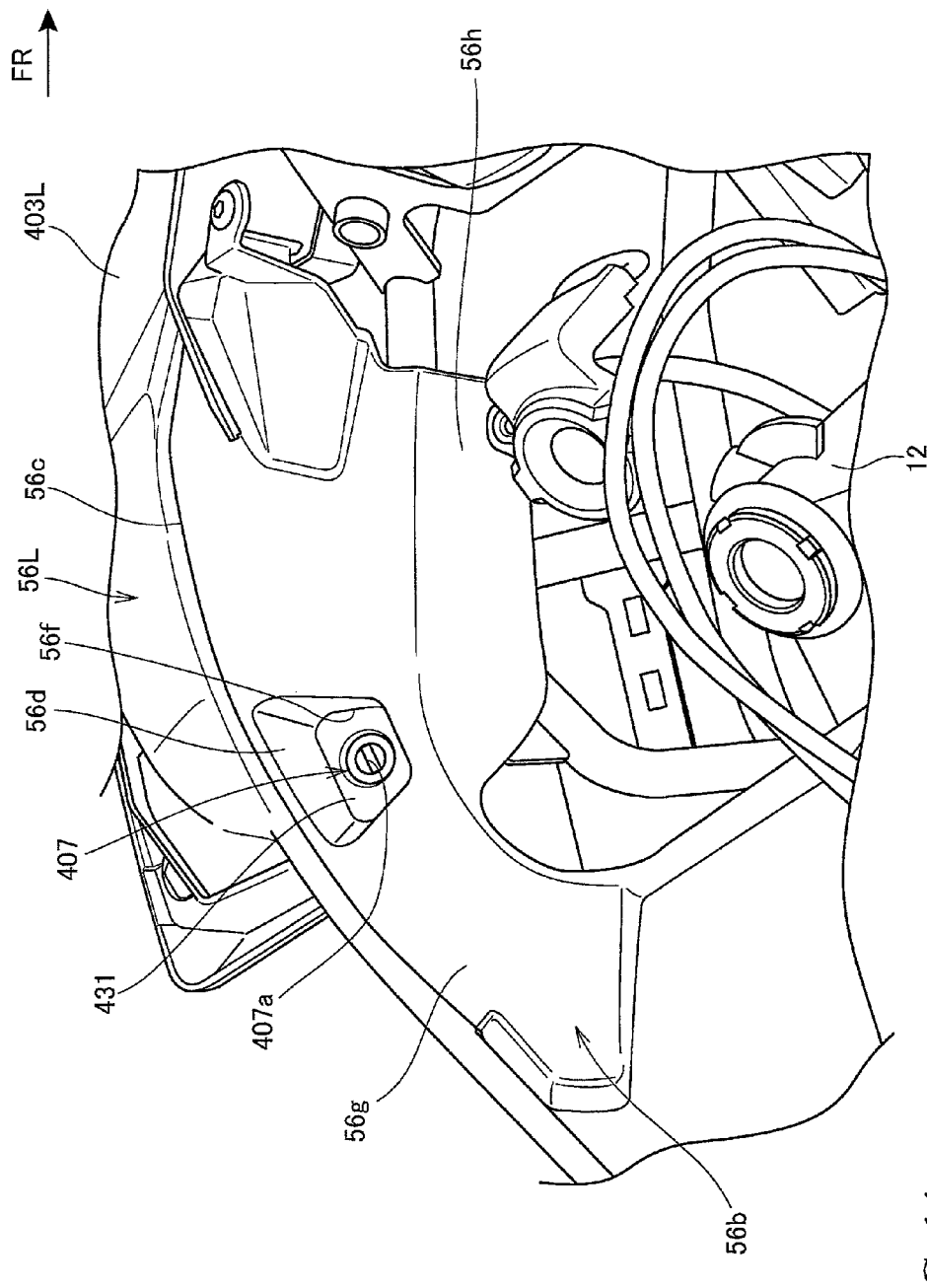
FIG. 14 is a main-portion perspective view showing the front portion of the vehicle body of the motorcycle.

FIG. 13 is a main-portion plan view showing the front portion of the vehicle body of the motorcycle 1. FIG. 14 is a main-portion perspective view showing the front portion of the vehicle body of the motorcycle 1.

As shown in FIGS. 13 and 14, the tank cover portions 56L, 56R include, at their front portions, outer covers 56a, 56a adjacent to the side mirrors 59, and inner covers 56b, 56j formed inward of the outer covers 56a, 56a integrally with the outer covers 56a, 56a. A ridge line 56c which is a border between the outer cover 54a and the inner cover 56b or between the outer cover 54a and the inner cover 56j is formed in a substantially arc shape which is convex outward in the vehicle width direction.

The left inner cover 56b has a recess portion 56d formed therein, and the recess portion 56d has, at its bottom, an opening 56f having a substantially trapezoid shape. A key insertion hole 407a of the key cylinder 407, a portion around the key insertion hole 407a, and part of a decorative plate 431 to be described later are exposed inside the opening 56f.

The inner cover 56b includes a first slanted surface 56g formed to descend from the ridge line 56c with a second slanted surface 56h formed to descend from an edge portion of the first slanted surface 56g at a steeper angle than the first slanted surface 56g does. The first slanted surface 56g has the recess portion 56d formed therein. The second slanted surface 56h is formed at a slant angle close to a right angle. Because the second slanted surface 56h is thus provided, the key cylinder 407 placed below the first slanted surface 56g is not exposed from a space between the inner cover 56b and the head pipe 12, and is therefore prevented from being vandalized.

The key cylinder 407 is placed at a position coinciding, in the front-rear direction of the vehicle body, with the position of the top bridge 30 which constitutes the steering system 29. In other words, the key cylinder 407 is placed at a position coinciding, in the front-rear direction, with an upper end portion of the steering shaft 425 rotatably supported inside the head pipe 12.

The handlebar 33 is supported by paired left and right handle holders 426, 426 attached to the top bridge 30.

Figure 15:
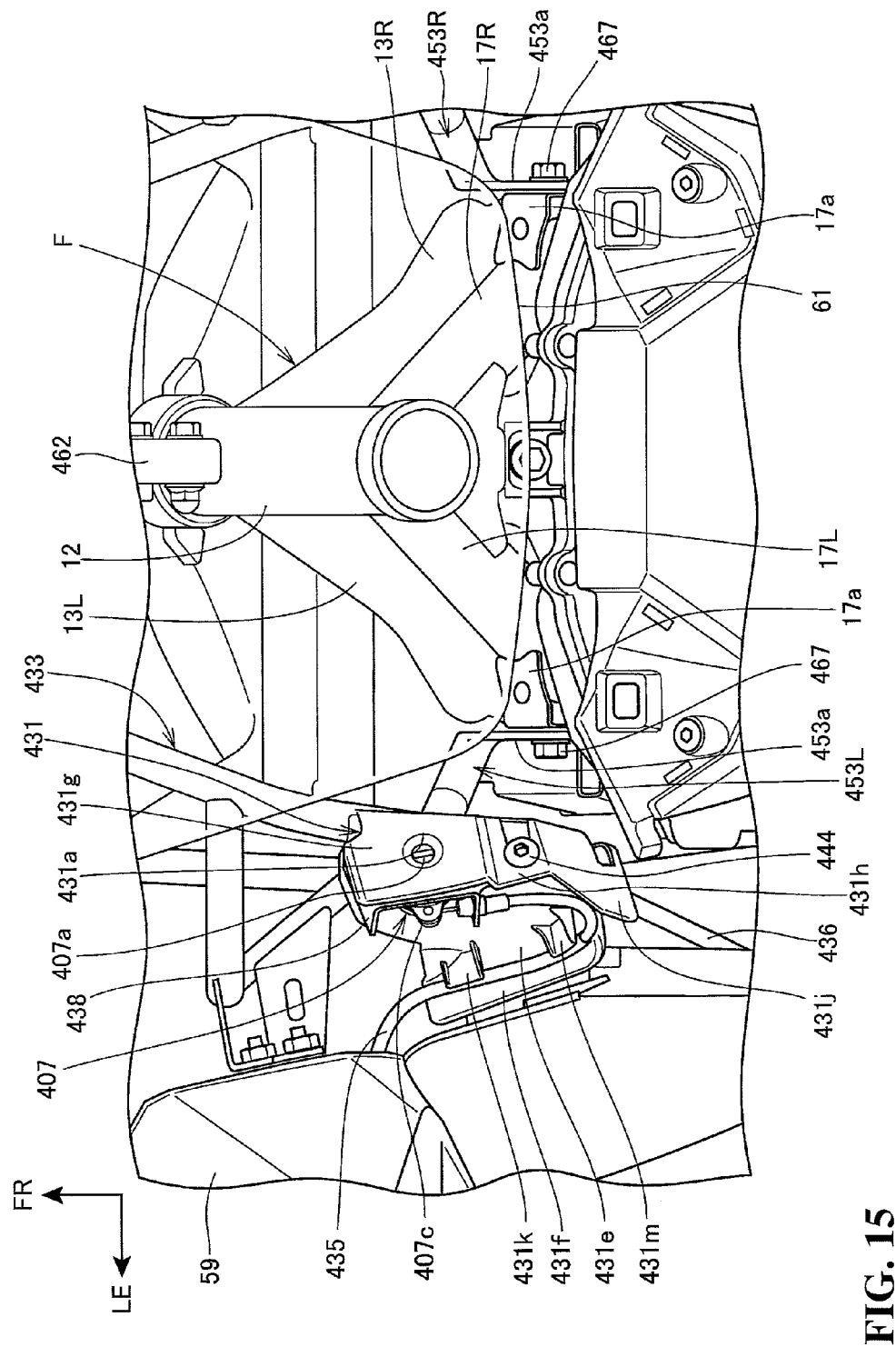
FIG. 15 is a main-portion plan view showing a state where tank covers are removed from the front portion of the vehicle body.

FIG. 15 is a main-portion plan view showing a state where the tank cover portions 56L, 56R (see FIG. 13) are removed from the front portion of the vehicle body.

The key cylinder 407 covered by the decorative plate 431 is placed below the left tank cover portion 56L. The decorative plate 431 has, at its upper portion, a circular opening 431a from which the key insertion hole 407a of the key cylinder 407 and a portion around the key insertion hole 407a are exposed. The opening 431a is smaller than the opening 56f (see FIG. 13) formed in the inner cover 56b (see FIG. 13).

As described, the key cylinder 407 is, from above, covered by the decorative plate 431 having the opening 431a, and as shown in FIG. 13, the decorative plate 431 is, from above, covered with the inner cover 56b having the opening 56f which is larger than the opening 431a. Thereby, even if the opening 431a of the decorative plate 431 and the opening 56f of the inner cover 56b do not coincide in their positions after assembly, the error in the positional relation between the opening 431a of the decorative plate 431 and the opening 56f of the inner cover 56b can be made less noticeable. Thus, a favorable outer appearance can be obtained while maintaining the positional relation between the key insertion hole 407a and the opening 431a of the decorative plate 431.

The key cylinder 407 is supported by a front sub frame 433 attached to a front portion of the vehicle-body frame F. Two cables, namely a first cable 435 extending to the front side of the vehicle body and a second cable 436 extending to the rear side of the vehicle body, are connected at their one ends to the key cylinder 407.

Figure 16:
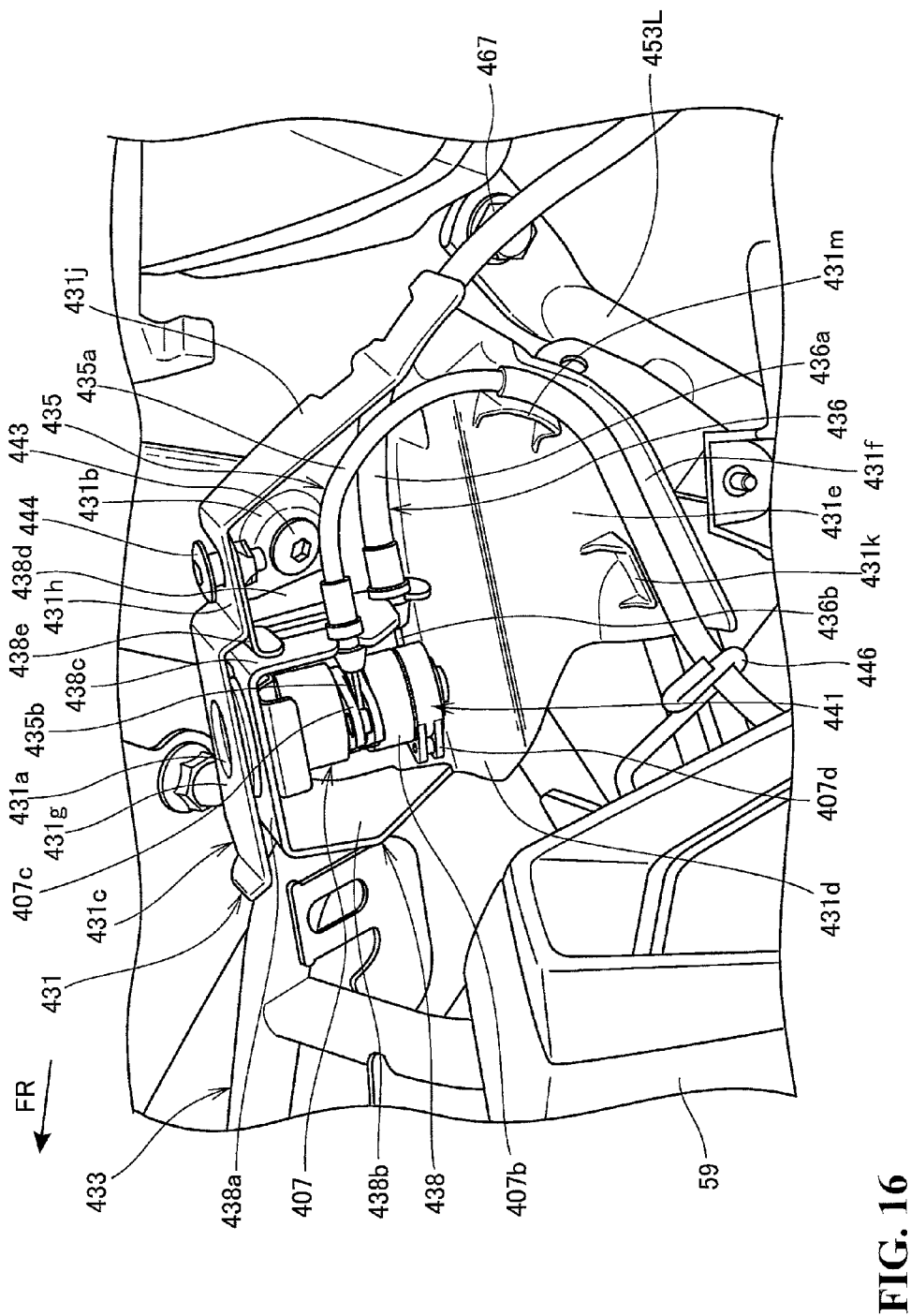
FIG. 16 is a perspective view showing a key cylinder and its surroundings.

FIG. 16 is a perspective view showing the key cylinder 407 and its surroundings.

The front sub frame 433 includes a key-cylinder retention portion 438 formed by bending a steel plate. The key cylinder 407 is placed inside the key-cylinder retention portion 438. The key-cylinder retention portion 438 integrally includes an upper wall 438a, a front wall 438b, a rear wall 438c, and an inner side wall 438d. An upper portion of the key cylinder 407 is attached to the upper wall 438a. The front wall 438b, the rear wall 438c, and the inner side wall 438d cover the key cylinder 407 from the front, the rear, and the inner side, respectively.

The first cable 435 includes an outer cable 435a forming an outer portion of the first cable 435, and an inner wire 435b movably inserted in the outer cable 435a. The outer cable 435a has its tip end portion attached to an edge portion of the rear wall 438c, the edge portion being located on an outer side of the rear wall 438c in the vehicle width direction. The inner wire 435b has its tip end portion connected to a first arm portion 407c protruding from an outer peripheral portion 407b of the key cylinder 407. The other end portion of the first cable 435 is connected to the left lid lock mechanism 406L (see FIG. 7).

Similarly, the second cable 436 includes an outer cable 436a forming an outer portion of the second cable 436, and an inner wire 436b movably inserted in the outer cable 436a. The outer cable 436a has its tip end portion attached to a lower edge portion of the rear wall 438c with the lower edge portion being located on an inner side of the rear wall 438c in the vehicle width direction. The inner wire 436b has its tip end portion connected to a second arm portion 407d protruding from the outer peripheral portion 407b of the key cylinder 407. The other end portion of the second cable 436 is connected to a seat lock mechanism 437 attached to an upper portion of the lower-portion cross frame 24 constituting the vehicle-body frame F in FIG. 6.

The key cylinder 407 mainly includes an external cylinder 441, an internal cylinder (not shown) rotatably inserted in the external cylinder 441, and multiple tumblers (not shown) laid between the external cylinder 441 and the internal cylinder. The key insertion hole 407a (see FIG. 15) is provided at an upper end portion of the internal cylinder.

When no key is inserted into the internal cylinder, the tumblers are located between the external cylinder 441 and the internal cylinder, so that the internal cylinder is unable to turn relative to the external cylinder 441. When a key is inserted into the internal cylinder, the tumblers corresponding to grooves or teeth provided in the key move between the external cylinder 441 and the internal cylinder, and all the tumblers thus shift to the external cylinder 441 side or the internal cylinder side, so that the internal cylinder is able to turn leftward or rightward inside the external cylinder 441.

The first arm portion 407c and the second arm portion 407d described above are attached integrally to the internal cylinder, and therefore can turn along with the internal cylinder. For example, the first arm portion 407c turns to the right when a key is inserted into the key cylinder 407 through the key insertion hole 407a and rotated to the right, and turns to the left when the key is rotated to the left. The inner wire 435b of the first cable 435 is pulled when the first arm portion 407c turns to the right, and the inner wire 436b of the second cable 436 is pulled when the second arm portion 407d turns to the left.

The decorative plate 431 integrally includes an inner side portion 431b, an upper strip-shaped portion 431c, a lower-portion covering portion 431d, a downwardly extension portion 431e, and a lower guide portion 431f.

The inner side portion 431b is fastened to the inner side wall 438d of the key-cylinder retention portion 438 with a bolt 443 in the substantial vehicle width direction. The upper strip-shaped portion 431c extends from an upper edge of the inner side portion 431b outwardly in the vehicle width direction and extends in the front-rear direction while bending. The lower-portion covering portion 431d extends from a lower edge of the inner side portion 431b outwardly in the vehicle width direction and covers the key cylinder 407 from below. The downwardly extension portion 431e extends downwardly from a side edge of the lower-portion covering portion 431 d. The lower guide portion 431f is a portion extending from a lower edge of the downwardly extension portion 431e outwardly in the vehicle width direction with its rear portion elevated, and guides the first cable 435 such that the first cable 435 takes a U turn, extending from the key cylinder 407 side rearwardly, then downwardly, and then towards the front.

The upper strip-shaped portion 431c includes an upper step portion 431g, a lower step portion 431h, and an upper guide portion 431j. The upper step portion 431g has the round opening 431a. The lower step portion 431h is fastened to a rearwardly extension portion 438e of the key-cylinder retention portion 438 substantially vertically with a bolt 444, the rearwardly extension portion 438e extending rearwardly from the rear wall 438c of the key-cylinder retention portion 438. The upper guide portion 431j is a portion formed with its portion lowered, and guides the second cable 436 from above such that the second cable 436 extending from the key cylinder 407 side extends rearwardly and obliquely downwardly.

The lower-portion covering portion 431d covers the key cylinder 407 and the tip end portion of each of the first cable 435 and the second cable 436 from below. The downwardly extension portion 431e integrally includes protrusions 431k, 431m which determine the position of the second cable 436 on their outer side surfaces from above. Thus, the second cable 436 is determined in its position by being held between the lower guide portion 431f from below and the protrusions 431k, 431m from above.

The aforementioned inner side portion 431b is fastened to the inner side wall 438d in the substantial vehicle width direction, and the lower step portion 431h is fastened to the rearwardly extension portion 438e in the substantial vertical direction. Thus, the attachment accuracy of the decorative plate 431 in the vehicle width direction, the front-rear direction, and the up-down direction can be improved more. As a result, as shown in FIG. 15, the positional accuracy of the opening 431a of the decorative plate 431 relative to the key insertion hole 407a of the key cylinder 407 can be improved. Thus, the outer appearance is improved.

Figure 17:
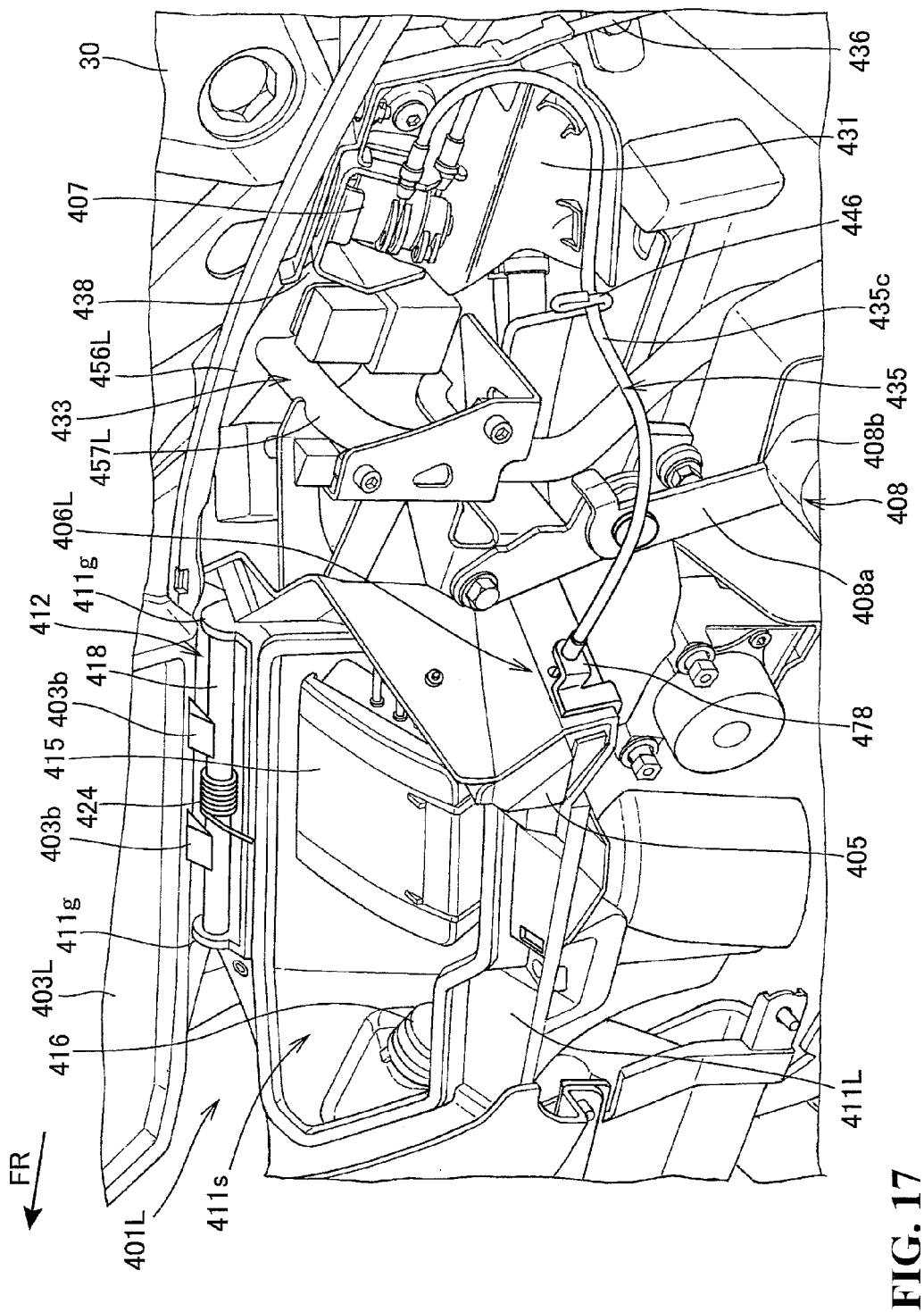
FIG. 17 is a perspective view showing a portion of connection between the key cylinder and a lid lock mechanism.

FIG. 17 is a perspective view showing a portion of the connection between the key cylinder 407 and the lid lock mechanism 406L.

The lid lock mechanism 406L provided in the storage portion 401L at the front left portion of the vehicle body is connected to the key cylinder 407 via the first cable 435. The lid lock mechanism 406L is provided in a lower portion of a rear portion of the storage portion 401L, and placed inwardly of the lid actuator 405 in the vehicle width direction. The key cylinder 407 is placed on a vehicle-body rear side of the storage portion 401L and inwardly of the storage portion 401L in the vehicle width direction. Thus, the first cable 435 from the key cylinder 407 is connected to the lid lock mechanism 406L such that the first cable 435 extends from the key cylinder 407 to the rear side of the vehicle body, takes a U-turn to the front side of the vehicle body, extends outwardly in the vehicle width direction, and extends to the front side of the vehicle body after bending. The first cable 435 has a bent portion 435c at its middle portion, the bent portion 435c being formed when the first cable 435 is supported by a wire hook 446 provided at the front sub frame 433.

The lid lock mechanism 406L has a function of not only locking the lid 403L to the closed state, but also keeping the lid 403L in the closed state when the lid actuator 405 on the storage portion 401L side is manipulated to open the lid 403L without a predetermined manipulation being performed.

This predetermined manipulation is to insert a key into the key cylinder 407 and rotate the key to the right. More specifically, when a key is inserted into the key cylinder 407 and rotated to the right, the inner wire 435b of the first cable 435 shown in FIG. 16 is pulled. When the lid actuator 405 shown in FIG. 9 is pushed in this state, the lid lock mechanism 406L is released to permit the lid 403L to open. The structure and operation of the lid lock mechanism 406L will be described in detail with reference to FIGS. 20(A) and (B) and FIGS. 21(A) to 21(C).

Such a predetermined manipulation is needed only for the left storage portion 401L. More specifically, in FIG. 8, the lid lock mechanism 406R provided in the right storage portion 401R only has a function of locking the lid 403R to the closed state or unlocking the lid 403R. To be more specific, pressing the right lid actuator 405 always unlocks the lid lock mechanism 406R and opens the lid 403R.

The lid 403L, 403R (see FIG. 8 for the lid 403R) is biased to be in an open state by the torsion coil spring 424 provided to the hinge 412. Thus, when the lid actuator 405 is manipulated to unlock the lid lock mechanism 406L, 406R (see FIG. 8 for the lid lock mechanism 406R), the lid 403L, 403R automatically moves to the open state. This omits a turning action and therefore improves the convenience of operation. This convenience effect is especially large in opening the left storage portion 401L as described earlier because the manipulation of the key cylinder 407 is needed in addition to the manipulation of the lid actuator 405.

In addition, in FIG. 16, when a key is inserted into the key cylinder 407 and rotated to the left, the inner wire 436b of the second cable 436 is pulled to unlock the seat lock mechanism 437 shown in FIG. 6, thereby enabling removable of the main seat 45 (see FIG. 10).

Figure 18:
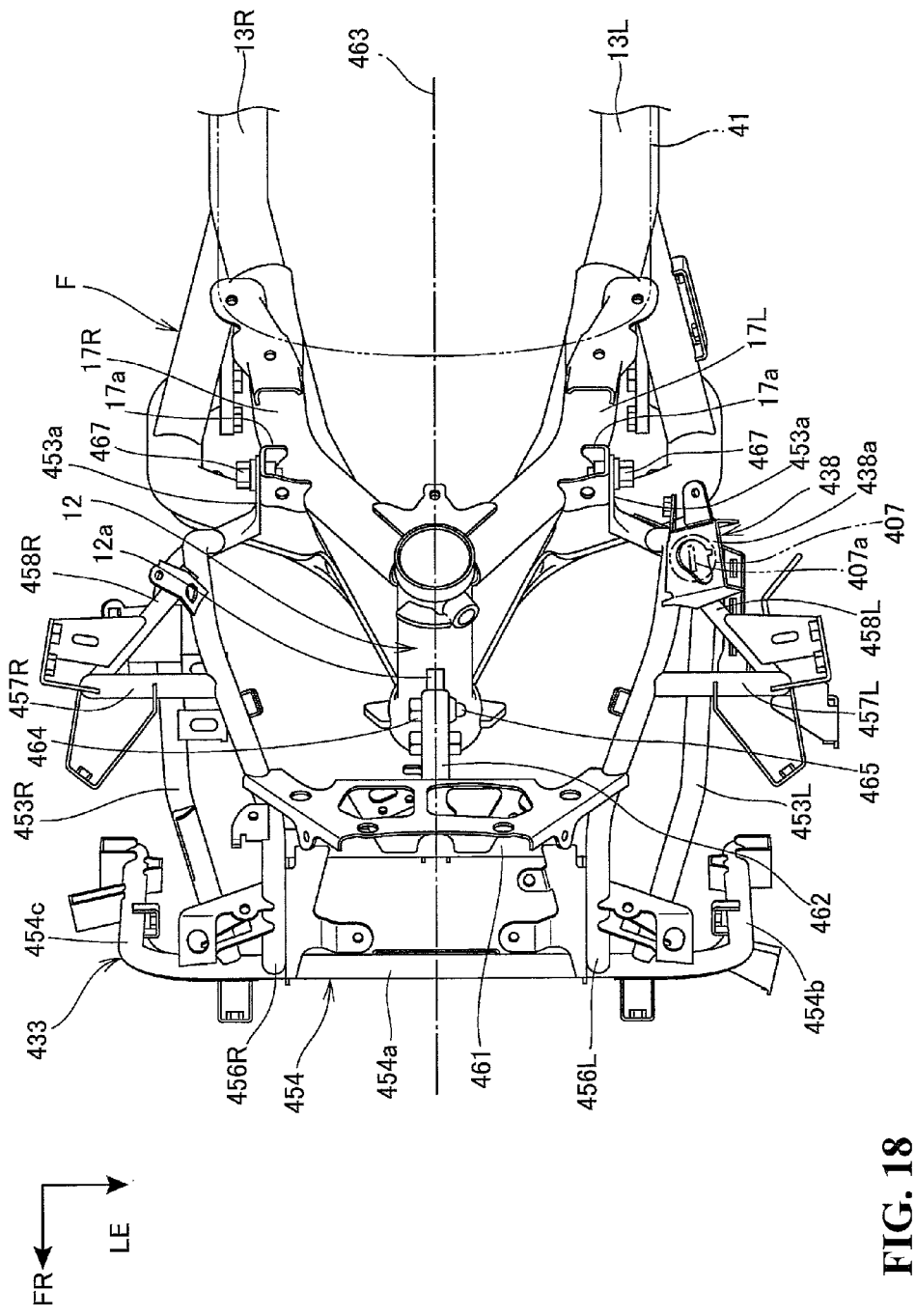
FIG. 18 is a plan view showing a front portion of the vehicle-body frame and a front sub frame.
Figure 19:
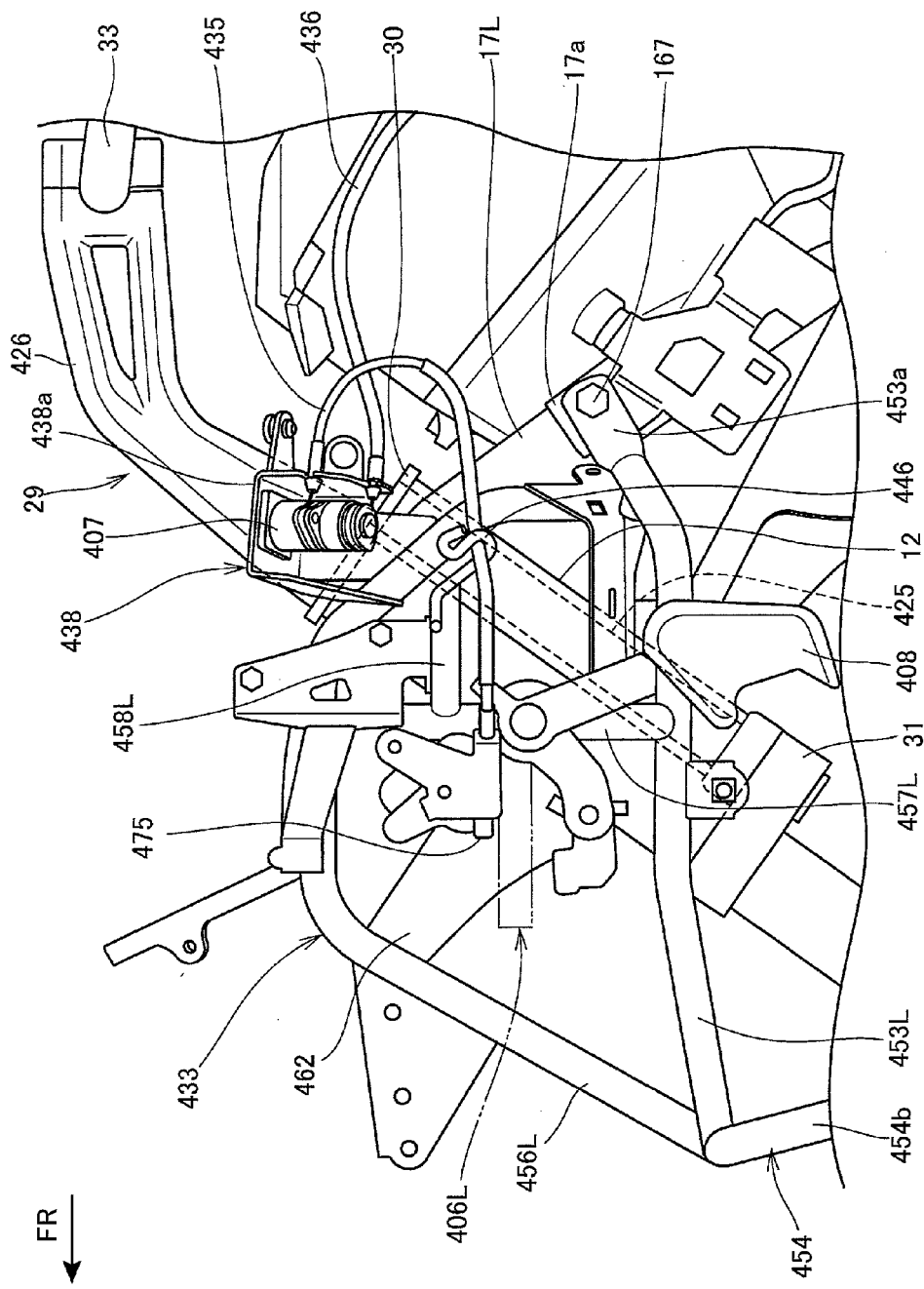
FIG. 19 is a side view showing the front sub frame provided in the front portion of the vehicle body.

FIG. 18 is a plan view showing the front portion of the vehicle-body frame F and the front sub frame 433. FIG. 19 is a side view showing the front sub frame 433 provided in the front portion of the vehicle body.

As shown in FIGS. 18 and 19, the front sub frame 433 includes paired left and right first front-rear extension frames 453L, 453R, a front cross frame 454, paired left and right second front-rear extension frames 456L, 456R, paired left and right side connecting frames 457L, 457R, paired left and right side slanted frames 458L, 458R, a connecting cross frame 461 and a center bracket 462. A vehicle-body center line 463 extends in the front-rear direction through the center of the vehicle body in the vehicle width direction.

The first front-rear extension frames 453L, 453R are attached, at their rear end portions 453a, to brackets 17a, 17a provided at the gusset frames 17L, 17R with bolts 467, respectively. The rear end portions 453a are each a portion formed by compressing a pipe into a plate to be suitable for attachment to the bracket 17a. The front cross frame 454 integrally has a straight portion 454a extending straight in the vehicle width direction, and paired left and right vertical extension portions 454b, 454c formed by bending ends of the straight portion 454a downwardly. The straight portion 454a is attached to front ends of the left and right first front-rear extension frames 453L, 453R.

The second front-rear extension frames 456L, 456R extend in the front-rear direction while curving upwardly between the front cross frame 454 and rear portions of the first front-rear extension frames 453L, 453R, respectively. The side connecting frames 457L, 457R extend vertically while curving outwardly in the vehicle width direction between the first front-rear extension frame 453L and the second front-rear extension frame 456L and between the first front-rear extension frame 453R and the second front-rear extension frame 456R, respectively.

The side slanted frames 458L, 458R extend almost horizontally and straight between the second front-rear extension frame 456L and the side connecting frame 457L and between the second front-rear extension frame 456R and the side connecting frame 457R, respectively. The connecting cross frame 461 extend straight in the vehicle width direction between the left and right second front-rear extension frames 456L, 456R. The center bracket 462 extends rearwardly and obliquely downwardly from a center portion of the connecting cross frame 461 and has its tip end portion attached, with a bolt 464 and a nut 465, to a bracket 12a provided on a front surface of the head pipe 12.

The key-cylinder retention portion 438 retaining the key cylinder 407 is attached to an upper portion of a rear portion of the left second front-rear extension frame 456L. More specifically, in the plan view shown in FIG. 18, the key-cylinder retention portion 438 is placed at a position where the first front-rear extension frame 453L and the second front-rear extension frame 456L overlap. In the front-rear direction, the key-cylinder retention portion 438 is placed at a position coinciding with an upper portion of the head pipe 12. Further, in the side view shown in FIG. 19, the key-cylinder retention portion 438 overlaps with the top bridge 30 constituting the steering system 29 and the handle holders 426. The left lid lock mechanism 406L is, in a side view, placed frontward and obliquely downwardly of the key cylinder 407.

An upper surface of the upper wall 438a of the key-cylinder retention portion 438 is oriented obliquely upwardly and inwardly in the vehicle width direction. Since the key insertion hole 407a of the key cylinder 407 is also oriented obliquely upwardly and inwardly in the vehicle width direction, a driver can insert a key into the key insertion hole 407a even with, for example, the driver being off the vehicle and standing on the left side of the vehicle body. Thus, for example, the driver can unlock the seat lock mechanism 437 (see FIG. 6) by turning the key with one hand and raise the main seat 45 (see FIG. 4) with the other hand.

Figure 20A:
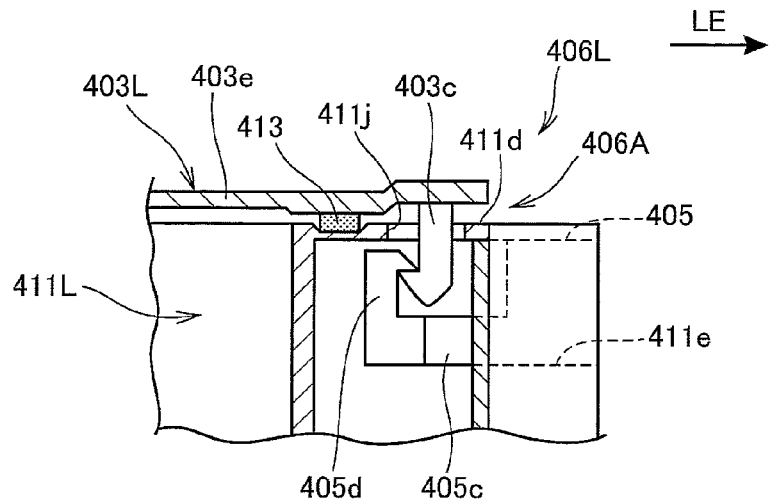
FIGS. 20(A) and 20(B) are each an illustration diagram showing the lid lock mechanism, FIG. 20(A) being a sectional view showing the lid lock mechanism from front, FIG. 20(B) showing the lid lock mechanism from above.
Figure 20B:
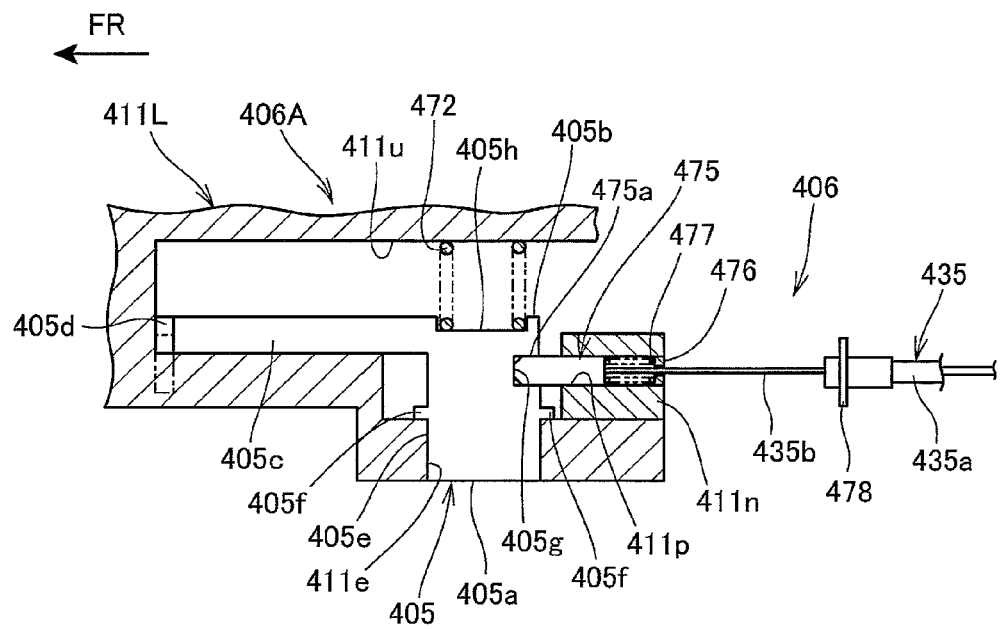

FIGS. 20(A) and 20(B) are each an illustration diagram showing the lid lock mechanism 406L. FIG. 20(A) is a sectional view showing the lid lock mechanism 406L from front. FIG. 20(B) is a sectional view showing the lid lock mechanism 406L from above.

As shown in FIG. 20(A), the lid 403L includes an inner plate 403e having a hook-shaped lid engagement portion 403c provided on its lower surface, and an outer plate (not shown) attached to the inner plate 403e and exposed to the outside.

The lid lock mechanism 406L includes a lock mechanism 406A configured not only to lock the lid 403L in the closed state, but also to unlock the lid 403L, and an unlock inhibition mechanism 406B configured to inhibit the lock mechanism 406A from unlocking the lid 403L or permitting the lock mechanism 406A to unlock the lid 403L (see FIG. 20(B)).

The lock mechanism 406A includes the actuator insertion hole 411e, the lid actuator 405, an actuator extended portion 405c and a hook portion 405d.

The actuator extended portion 405c is a portion formed integrally with the lid actuator 405, and integrally has the hook portion 405d at its tip end portion. The hook portion 405d engages with the lid engagement portion 403c of the lid 403L. An opening portion 411j is formed in the opening surrounding portion 411d of the storage-portion main body 411L with the lid engagement portion 403c being inserted into this opening portion 411j.

As shown in FIG. 20(B), the lid actuator 405 includes an outer end surface 405a to be pressed by a finger, an inner end surface 405b on a far side opposite the outer end surface 405a and an actuator projection portion 405f and an actuator recess portion 405g formed on a side surface 405e between the outer end surface 405a and the inner end surface 405b.

An end-portion recess portion 405h is formed in the inner end surface 405b. A compression coil spring 472 constituting part of the lock mechanism 406A is placed between the end-portion recess portion 405h and an inner surface 411u of the storage-portion main body 411L. The actuator projection portion 405f is a portion preventing the lid actuator 405 from coming off from the actuator insertion hole 411e, and is pressed against an inner surface of the storage-portion main body 411L by the compression coil spring 472. The actuator recess portion 405g is a portion to engage with part of the unlock inhibition mechanism 406B to be described in detail later.

The actuator extended portion 405c is a portion extending straight frontward integrally from the inner end portion side of the lid actuator 405 and is integrally provided with the hook portion 405d at its front end portion.

The unlock inhibition mechanism 406B includes a protrusion wall 411n, a pin insertion hole 411p, an unlock inhibition pin 475, a ring member 476, a compression coil spring 477 and the actuator recess portion 405g of the lid actuator 405.

The pin insertion hole 411p is opened in the protrusion wall 411n provided on the storage-portion main body 411L and extends in the front-rear direction. The ring member 476 is fixed to a rear end portion of the pin insertion hole 411p. The unlock inhibition pin 475 is movably inserted in the pin insertion hole 411p, and is inserted into the actuator recess portion 405g of the lid actuator 405 while biased thereto by the compression coil spring 477 provided between the unlock inhibition pin 475 and the ring member 476. The inner wire 435b of the first cable 435 is connected to a rear end of the unlock inhibition pin 475. A cable-end support portion 478 is provided on the front sub frame 433 (see FIG. 19) to support the outer cable 435a of the first cable 435.

The above-described configuration of the unlock inhibition mechanism 406B does not permit the lid 403L to open in the state shown in FIG. 20(B) because the unlock inhibition pin 475 is inserted into the actuator recess portion 405g of the lid actuator 405 to make the lid actuator 405 unable to be operated.

Figure 21A:
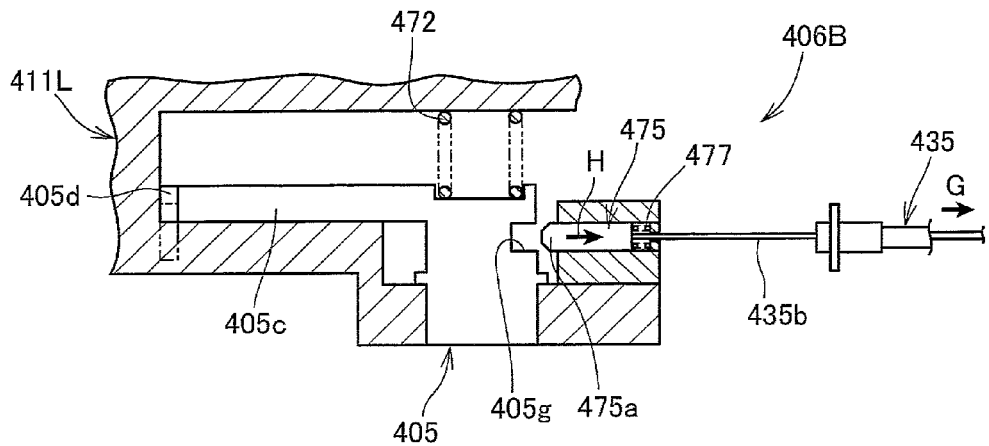
FIGS. 21(A) to 21(C) are each an operational diagram showing the operation of the lid lock mechanism, FIG. 21(A) being an operational diagram showing a state where an unlock inhibition mechanism is being actuated, FIG. 21(B) being an operational diagram showing a state where the lid actuator is being manipulated, FIG. 21(C) being an operational diagram showing how the lock mechanism is being actuated.
Figure 21B:
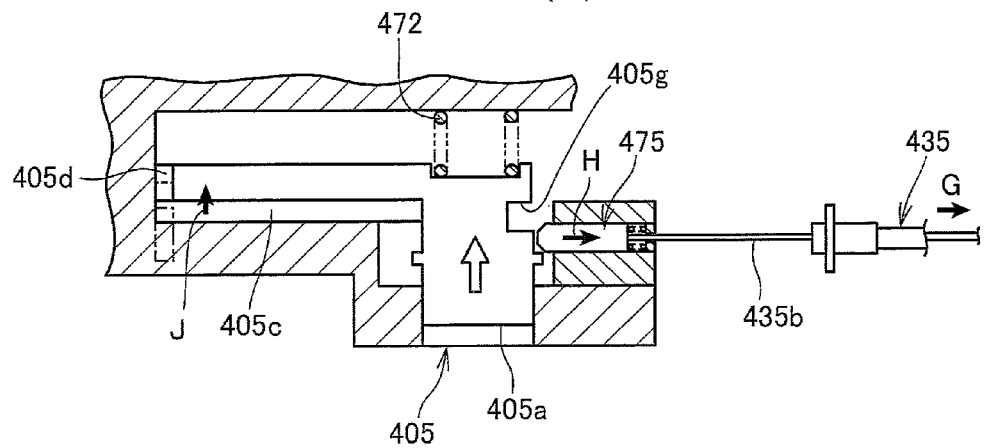
Figure 21C:
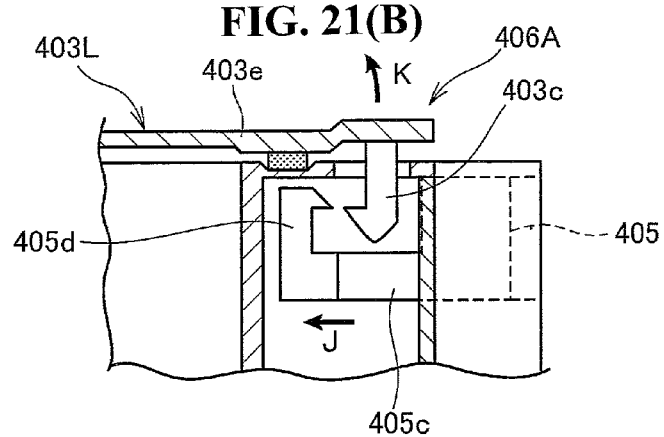

FIGS. 21(A) to 21(C) are each an operational diagram showing the operation of the lid lock mechanism 406L. FIG. 21(A) an operational diagram showing a state where the unlock inhibition mechanism 406B is being actuated. FIG. 21(B) is an operational diagram showing a state where the lid actuator 405 is being manipulated. FIG. 21(C) is an operational diagram showing how the lock mechanism 406A is being actuated.

As shown in FIG. 21(A), the key is inserted into the key cylinder 407 (see FIG. 17) and rotated to the right. As a result, the inner wire 435b of the first cable 435 connected to the key cylinder 407 is pulled as shown by arrow G. This makes the unlock inhibition pin 475 retreat as shown by arrow H against the elastic force of the compression coil spring 477 and a tip end portion 475a of the unlock inhibition pin 475 thereby comes off from actuator recess portion 405g formed in the lid actuator 405.

Next, as shown in FIG. 21(B), the outer end surface 405a of the lid actuator 405 is pressed to move the lid actuator 405 inwardly in the vehicle width direction against the elastic force of the compression coil spring 472, as shown by the white arrow. As a result, along with the lid actuator 405, the actuator extended portion 405c and the hook portion 405d move inwardly in the vehicle width direction as shown by arrow J.

Then, as shown in FIG. 21(C), thus moving inwardly in the vehicle width direction, the hook portion 405d comes off from the lid engagement portion 403c of the lid 403L and the lid engagement portion 403c moves as shown by arrow K due to the elastic force of the torsion coil spring 424 (see FIG. 11) provided on the hinge 412 (see FIG. 11). Thus, the lid 403L opens.

In FIG. 21(A), if manipulation of the key cylinder side is not performed, i.e., if the inner wire 435b of the first cable 435 is not pulled, the state in FIG. 20(A) is maintained to make the lid actuator 405 unable to be pressed. Thus, the lid 403L cannot be opened.

As shown in FIGS. 1, 8, 9 and 13, in a vehicle-body storage structure for the motorcycle 1 as a saddle-ride type vehicle including the vehicle-body frame F, the steering shaft 425 is rotatably supported at a front end of the vehicle-body frame F to make the front wheel 2 steerable with the front cover 47 being placed to surround the steering shaft 425 and covering the front portion of the vehicle body and the storage portion 401L, 401R provided on the front cover 47. The storage portion 401L, 401R includes the opening 411b provided at a position shifted to one or each of sides of the front cover 47 in the left-right direction with the recess portion 411s being concave downwardly from the opening 411b to form a storage space; and the lid 403L, 403R covering the opening 411b openably and closably. The lid 403L, 403R is attached to the upper side wall portion 411r openably and closably via the hinge 412, the upper side wall portion 411r being a vehicle-width-direction inner side portion defining the recess portion 411s.

According to the configuration described above, the lid 403L, 403R can be opened wide vertically at its outer end portion in the vehicle width direction, enabling an item to be easily stored in or retrieved from the storage portion 401L, 401R from the side of the vehicle body.

In addition, the lid actuator 405 as an actuator is provided at one or each of side portions of the front cover 47 and manipulation of the lid actuator 405 changes the lid 403L, 403R from a locked state where the lid 403L, 403R is locked with the front cover 47 side to an open state. Since the lid actuator 405 is thus provided at the side portion(s) of the front cover 47, the lid actuator 405 can be easily operated to store or retrieve an item in or from the side of the vehicle body. Thus, handleability of the storage portion 401L, 401R can be improved.

Further, as shown in FIGS. 8, 9 and 10, the opening 411b is substantially rectangular and is placed with a longer side thereof being along the front cover 47 (see FIG. 7) in the substantial front-rear direction of the vehicle and the lid 403L, 403R is biased to be in the open state. Since the opening 411b is substantially rectangular which is long in the substantial front-rear direction of the vehicle, the driver can easily store or retrieve an item while standing on the side of the vehicle. Since the lid 403L, 403R is biased to be in the open state, convenience improves.

Moreover, as shown in FIGS. 7 and 8, the side mirrors 59 are placed rearwardly of the lids 403L, 403R and the side cover portions 55L, 55R as front side covers are placed below the lids 403L, 403R, respectively. When the lid 403L, 403R is closed, i.e., is in the locked state, the lid actuator 405 is, in a side view, provided at a location surrounded by the lid 403L, 403R, the side mirror 59 and the side cover portion 55L, 55R. By thus placing the lid actuator 405 at the location where multiple components exist and dimensional errors are likely to occur, the dimensional errors can be absorbed while keeping the outer appearance favorable. Since the dimensional errors in the components can be absorbed, assemblability can be improved.

Further, as shown in FIGS. 8, 17 and 20(A), the unlock inhibition pin 475, as an actuation inhibition member, configured to inhibit the lid 403L, 403R from opening is provided in addition to the lid actuator 405 and the unlock inhibition pin 475 is connected to the key cylinder 407 via the first cable 435. Inhibition by the unlock inhibition pin 475 is released only when the predetermined manipulation is performed on the key cylinder 407. Since the unlock inhibition pin 475 does not permit the lid 403L to be opened without the driver's intent, the lid 403L can be prevented from opening without the driver's intent. Thus, vandalization can be prevented.

Further, as shown in FIGS. 7 and 19, the key cylinder 407 is placed inside the vehicle-body cover C on the lid actuator 405 side, at a position overlapping the steering shaft 425 in a side view. Thus, the key cylinder 407 and the lid actuator 405 are both placed at the front portion of the vehicle body, so that the key cylinder 407 and the lid actuator 405 can be placed more closely to each other. This can shorten the length of the first cable 435 provided between the key cylinder 407 and the lid actuator 405. Thus, reduction in both weight and costs can be achieved.

As shown in FIGS. 1, 10, 17 and 20(A), the kickstand 67 is provided on the left side of the vehicle body and the key cylinder 407, the unlock inhibition pin 475 and the first cable 435 are placed leftward of the center of the vehicle body. The unlock inhibition pin 475 inhibits only the left lid actuator 405 from unlocking the lid 403L in the locked state. Electric components, namely the vehicle-mounted ETC device 415 and the cigarette socket 416, are placed in the left storage portion 401L. Since only the left lid actuator 405 is inhibited from unlocking the lid 403L in the locked state, the lid 403L of the left storage portion 401L cannot be opened easily when the vehicle is parked on the left side of a road using the kickstand 67. Thus, vandalization on the vehicle-mounted ETC device 415 or the cigarette socket 416 stored in the left storage portion 401L can be prevented.

Moreover, as shown in FIG. 12, the cigarette socket 416, being an electric component, is attached in the storage portion 401L, or more specifically, to the upper bulging wall 411h (a front wall) of the storage-portion main body 411L. Because the most part of the cigarette socket 416 is placed outside of the storage-portion main body 411L, effective use can be made of front and rear spaces in the storage portion 401L. In addition, since a cigarette plug can be inserted into the cigarette socket 416 in the storage portion 401L from the rear to the front, handleability of the cigarette socket 416 can be improved.

Further, as shown in FIG. 10, the vehicle-mounted ETC device 415, being an electric component, is provided in a rear portion of the storage portion 401L. Thus, effective use can be made of the space inside the storage portion 401L and the handleability of the vehicle-mounted ETC device 415 can be improved.

As shown in FIGS. 10 and 11, in a side view, the storage portion 401L is formed to have a step descending to a front side of the vehicle body and the vehicle-mounted ETC device 415 is placed on an upper portion of the step portion 411t forming the step. Thus, the vehicle-mounted ETC device 415 and other item can be stored separately from each other, allowing effective use of the space in the storage portion 401L as well as improvement in the handleability of the vehicle-mounted ETC device 415.

The embodiment described above only shows one aspect of the present invention and any modification or application thereof can be made without departing from the gist of the present invention.

For example, although only the left lid lock mechanism 406L is connected to the key cylinder 407 via the first cable 435 as shown in FIG. 17 in the above embodiment, the present invention is not limited to this. The right lid lock mechanism 406R (see FIG. 8) can also be connected to the key cylinder 407 via a cable so that, in FIGS. 8 and 17, the left or right lid 403L or 403R may be opened when a corresponding one of the left and right lid actuators 405, 405 is operated while a key inserted into the key cylinder 407 is being turned.

The present invention is applicable not only to the motorcycle 1, but also to a saddle-ride type vehicle other than a motorcycle. Note that a saddle-ride type vehicle includes all kinds of vehicles ridden by a driver by straddling its vehicle body. A saddle-ride type vehicle is a vehicle including not only a motorcycle (including a motorized bicycle), but also a three-wheeled vehicle or a four-wheeled vehicle classified as an ATV (all-terrain vehicle).

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

What is claimed is:

1. A storage structure for a saddle-ride vehicle comprising:
   a vehicle body frame;
   a steering shaft being rotatably supported at a front end of the vehicle body frame for steering a front wheel;
   a front cover being placed to surround the steering shaft and covering a front portion of the vehicle body frame; and
   a storage portion provided on a front surface of the front cover;
   wherein the storage portion includes:
      an opening provided at a position shifted to one or each side of the front cover in a left-right direction;
      a recess portion being concave downwardly from the opening to form a storage space; and
      a lid covering the opening openably and closably; and
   said lid being attached to a vehicle-width-direction inner side portion defining the recess portion, openably and closably via a hinge.

2. The storage structure for a saddle-ride vehicle according to claim 1, wherein:
   an actuator is provided at one or each of side portions of the front cover, and
   manipulation of the actuator changes the lid from a locked state where the lid is locked with the front cover side to an open state.

3. The storage structure for a saddle-ride vehicle according to claim 1, wherein:
   the opening is substantially rectangular and is placed with a longer side thereof being along the front cover in a substantial front-rear direction of the vehicle; and
   the lid is biased to be in the open state.

4. The storage structure for a saddle-ride vehicle according to claim 2, wherein:
   the opening is substantially rectangular and is placed with a longer side thereof being along the front cover in a substantial front-rear direction of the vehicle; and
   the lid is biased to be in the open state.

5. The storage structure for a saddle-ride vehicle according to claim 1, wherein:
   a side mirror is placed rearwardly of the lid;
   a front side cover is placed below the lid; and
   when the lid is in the locked state, the actuator is, in a side view, provided at a location surrounded by the lid, the side mirror, and the front side cover.

6. The storage structure for a saddle-ride vehicle according to claim 2, wherein:
   a side mirror is placed rearwardly of the lid;
   a front side cover is placed below the lid; and
   when the lid is in the locked state, the actuator is, in a side view, provided at a location surrounded by the lid, the side mirror, and the front side cover.

7. The storage structure for a saddle-ride vehicle according to claim 1, wherein:
   an actuation inhibition member, configured to inhibit the lid from opening, is provided in addition to the actuator;
   the actuation inhibition member is connected to a key cylinder via a cable; and
   inhibition by the actuation inhibition member is released only when a predetermined manipulation is performed on the key cylinder.

8. The storage structure for a saddle-ride vehicle according to claim 2, wherein:
   an actuation inhibition member, configured to inhibit the lid from opening, is provided in addition to the actuator;
   the actuation inhibition member is connected to a key cylinder via a cable; and
   inhibition by the actuation inhibition member is released only when a predetermined manipulation is performed on the key cylinder.

9. The storage structure for a saddle-ride vehicle according to claim 7, wherein the key cylinder is placed inside a vehicle body cover on the actuator side, at a position overlapping the steering shaft in a side view.

10. The storage structure for a saddle-ride vehicle according to claim 7, wherein:
    a kickstand is provided on a left side of the vehicle body;
    the key cylinder, the actuation inhibition member, and the cable are placed leftward of a center of the vehicle body;
    the actuation inhibition member inhibits only the actuator that is located on the left side from unlocking the lid in the locked state; and
    an electric component is placed in the storage portion that is located on the left side.

11. The storage structure for a saddle-ride vehicle according to claim 9, wherein:
    a kickstand is provided on a left side of the vehicle body;
    the key cylinder, the actuation inhibition member, and the cable are placed leftward of a center of the vehicle body;
    the actuation inhibition member inhibits only the actuator that is located on the left side from unlocking the lid in the locked state; and
    an electric component is placed in the storage portion that is located on the left side.

12. The storage structure for a saddle-ride vehicle according to claim 10, wherein the electric component is a cigarette socket attached to a front wall of the storage portion.

13. The storage structure for a saddle-ride vehicle according to claim 10, wherein the electric component is a vehicle-mounted ETC device attached in a rear portion of the storage portion.

14. The storage structure for a saddle-ride vehicle according to claim 12, wherein the electric component is a vehicle-mounted ETC device attached in a rear portion of the storage portion.

15. The storage structure for a saddle-ride vehicle according to claim 13, wherein:
    in a side view, the storage portion is formed to have a step descending to a front side of the vehicle body; and
    the vehicle-mounted ETC device is placed on an upper portion of a step portion forming the step.

16. A storage structure for a saddle-ride vehicle comprising:
    a vehicle body frame;
    a front cover for covering a front portion of the vehicle body frame; and
    a storage portion provided on a front surface of the front cover;
    wherein the storage portion includes:
       an opening provided at a position shifted to at least one of each side of the front cover in a left-right direction;
       a recess portion being concave downwardly from the opening to form a storage space; and
       a lid covering operatively connected by a hinge to the storage portion in a vehicle-width-direction inner side portion defining the recess portion for opening and closing the storage portion.

17. The storage structure for a saddle-ride vehicle according to claim 16, wherein:
an actuator is provided on at least one of each side portions of the front cover, and
manipulation of the actuator changes the lid from a locked state where the lid is locked with the front cover side to an open state.

18. The storage structure for a saddle-ride vehicle according to claim 16, wherein:
the opening is substantially rectangular and is placed with a longer side thereof being along the front cover in a substantial front-rear direction of the vehicle; and
the lid is biased to be in the open state.

19. The storage structure for a saddle-ride vehicle according to claim 16, wherein:
a side mirror is placed rearwardly of the lid;
a front side cover is placed below the lid; and
when the lid is in the locked state, the actuator is, in a side view, provided at a location surrounded by the lid, the side mirror, and the front side cover.

20. The storage structure for a saddle-ride vehicle according to claim 16, wherein:
an actuation inhibition member, configured to inhibit the lid from opening, is provided in addition to the actuator;
the actuation inhibition member is connected to a key cylinder via a cable; and
inhibition by the actuation inhibition member is released only when a predetermined manipulation is performed on the key cylinder.

* * * * *